(12) United States Patent
Ding et al.

(10) Patent No.: US 9,984,606 B2
(45) Date of Patent: May 29, 2018

(54) DEVICE AND METHOD OF PROVIDING SAMPLED DATA AND DEVICE AND METHOD OF DISPLAYING DIAGNOSIS INTERFACE

(71) Applicant: SAMSUNG ELECTRONICS CO., LTD., Suwon-si (KR)

(72) Inventors: Xiaojing Ding, Hangzhou (CN); Lu Yang, Hangzhou (CN); Vinney Guo, Hangzhou (CN)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 289 days.

(21) Appl. No.: 14/824,176

(22) Filed: Aug. 12, 2015

(65) Prior Publication Data

US 2016/0049105 A1 Feb. 18, 2016

(30) Foreign Application Priority Data

Aug. 12, 2014 (CN) .......................... 2014 1 0395707
Jun. 15, 2015 (KR) ........................ 10-2015-0084327

(51) Int. Cl.
*G09G 3/00* (2006.01)
*G09G 3/20* (2006.01)
*G06F 11/32* (2006.01)
*G06F 11/07* (2006.01)

(52) U.S. Cl.
CPC .......... *G09G 3/006* (2013.01); *G06F 11/0706* (2013.01); *G06F 11/079* (2013.01); *G06F 11/321* (2013.01)

(58) Field of Classification Search
CPC ................. G09G 3/006; G09G 3/2085; G09G 2320/0295; G06F 11/079; G06F 11/0706
See application file for complete search history.

(56) References Cited

U.S. PATENT DOCUMENTS

2016/0003491 A1* 1/2016 D'Orlando ............. F24F 11/001
702/184

FOREIGN PATENT DOCUMENTS

CN 102662785 A 9/2012

* cited by examiner

*Primary Examiner* — Evan Pert
*Assistant Examiner* — Changhyun Yi
(74) *Attorney, Agent, or Firm* — Sughrue Mion, PLLC

(57) ABSTRACT

Provided is a device for diagnosing a display system of a terminal. The device includes: a sampling module configured to sample the display system of the terminal at at least one sampling breakpoint to acquire sampled data used for diagnosing the display system of the terminal; a storage configured to store the sampled data acquired by the sampling module; and a transmitter configured to transmit the sampled data stored in the storage for the diagnosing the display system.

18 Claims, 29 Drawing Sheets

DEVICE AND METHOD OF PROVIDING SAMPLED DATA AND DEVICE AND METHOD OF DISPLAYING DIAGNOSIS INTERFACE

CROSS-REFERENCE TO THE RELATED APPLICATIONS

This application claims priority from State Intellectual Property Office (SIPO) of the People's Republic of China No. 201410395707.7, filed on Aug. 12, 2014, in State Intellectual Property Office (SIPO) of the People's Republic of China and Korean Patent Application No. 10-2015-0084327, filed on Jun. 15, 2015, in the Korean Intellectual Property Office, the disclosures of which are incorporated herein in their entirety by reference

BACKGROUND

Apparatuses and methods consistent with exemplary embodiments of the inventive concept relate to diagnosis of a display system, more particularly, to a device and method of providing sampled data used for diagnosing a display system of a terminal at the terminal, and a device and method of displaying a diagnosis interface used for diagnosing the display system of the terminal at a control side.

Generally, during developing a terminal having an operation system, such as a smartphone, a tablet personal computer (PC), and a palm computer, developers may encounter various faults, most of which are system-level faults caused by software and hardware. For example, since an Android display system has high coupling characteristics between modules, and requires a high association level between hardware and software, a timely version upgrading, and the like, many faults occur during an actual developing process of the Android display system. However, it is difficult to accurately find out these faults with debugging tools such as Dalvik Debug Monitor Service (DDMS), Tracer for OpenGL ES, Hierarchy Viewer, Traceview, and Pixel Perfect magnification viewer.

Recently, when diagnosing the faults of the display system, the developers generally diagnose the faults by reading log information or by adding debug codes to source codes. However, since these two methods of diagnosing the faults of the display system greatly depend on the experience of the developers and demand a high skill level of the developers, it is difficult for less skilled developers to diagnose the faults accurately. In addition, the efficiency of either of these two diagnosis methods are relatively low.

Therefore, existing methods of diagnosing the display system of the terminal have failed to satisfy demands of the developers diagnosing the display system.

SUMMARY

The inventive concept provides a device and a method of providing sampled data and a device and method of displaying a diagnosis interface.

According to an aspect of an exemplary embodiment, there is provided a device for diagnosing a display system of a terminal. The device may include: a sampling module configured to sample the display system of the terminal at at least one sampling breakpoint to acquire sampled data used for diagnosing the display system of the terminal; a storage configured to store the sampled data acquired by the sampling module; and a transmitter configured to transmit the sampled data stored in the storage for the diagnosing the display system.

The device may further include: a breakpoint adding module configured to add the at least one sampling breakpoint to at least one work layer of the display system, wherein the work layer comprises an application framework layer, a hardware abstraction layer, and an operating system kernel layer, and the at least one sampling breakpoint is added to each of the at least one work layer by the breakpoint adding module.

The device may further include: a memory creator configured to create a memory pool which is used for storing the sampled data and includes a plurality of memory blocks; and a memory block allocator configured to allocate a memory block, among the plurality of memory blocks, used for storing the sampled data acquired through the sampling at the at least one sampling breakpoint to each of the at least one sampling breakpoint.

According to another aspect of the inventive concept, there is provided a device for diagnosing a display system of a terminal at a control side, the device including: a controller configured to control the terminal to sample the display system of the terminal; a receiving module configured to receive sampled data acquired through sampling from the terminal; a diagnosis interface generator configured to generate a diagnosis interface used for diagnosing the display system of the terminal based on the sampled data; and a display configured to display the diagnosis interface generated by the diagnosis interface generator.

The controller may include: a sampling starting command sender configured to generate a sampling starting command and send the generated sampling starting command to the terminal to control the terminal to start the sampling at a sampling breakpoint; and a sampling stopping command sender configured to generate a sampling stopping command and send the generated sampling stopping command to the terminal to control the terminal to stop the sampling at the sampling breakpoint.

The controller may further include: a monitor configured to monitor whether an event causing an abnormal display occurs in the terminal during a working process, wherein the sampling starting command is generated by the sampling starting command sender in response to monitoring the event by the monitor, and the sampling stopping command is generated by the sampling stopping command sender in response to the event being terminated or a duration of the event being longer than a predetermined period of time.

The diagnosis interface may include: an image diagnosis window configured to display a frame image with respect to an application which is being under diagnosis; and a status diagnosis window configured to display a working status with respect to the application which is being under diagnosis.

The diagnosis interface generator may further include: an image generator configured to generate the image diagnosis window based on frame information of the application that is being under diagnosis; a status generator configured to generate the status diagnosis window based on status information of the application that is being under diagnosis; and a display mode selector configured to select a static display mode or a dynamic display mode.

The image diagnosis window may be generated by the image generator according to the static display mode or the dynamic display mode selected by the display mode selector.

The status diagnosis window may be generated by the status generator according to the static display mode or the dynamic display mode selected by the display mode selector.

According to an aspect of another exemplary embodiment, there is provided a method of providing sampled data used for diagnosing a display system of a terminal at the terminal. The method may include: acquiring sampled data by sampling the display system of the terminal at at least one sampling breakpoint; storing the sampled data; and transmitting the stored sampled data for the diagnosing the display system.

The method may further include: adding the at least one sampling breakpoint to at least one work layer of the display system; creating a memory pool including a plurality of memory blocks to store the sampled data; and allocating a memory block, among the plurality of memory blocks, to each of the at least one sampling breakpoint, the memory block storing the sampled data acquired through the sampling at the at least one sampling breakpoint.

The method may further include generating a diagnosis interface based on the sampled data, the diagnosis interface diagnosing the display system of the terminal.

The method may further include: generating a sampling starting command for staring sampling the display system at the sampling breakpoint, and sending the generated sampling starting command to the terminal; and generating a sampling stopping command for stopping sampling the display system, and sending the generated sampling stopping command to the terminal.

The method may further include monitoring whether an event causing an abnormal display occurs at the terminal in a working process, wherein the sampling starting command is generated by the sampling starting command sender in response to monitoring the event by the monitor, and the sampling stopping command is generated by the sampling stopping command sender in response to the event being terminated or a duration of the event being longer than a predetermined period of time.

BRIEF DESCRIPTION OF THE DRAWINGS

Exemplary embodiments of the inventive concept will be more clearly understood from the following detailed description taken in conjunction with the accompanying drawings, in which.

DETAILED DESCRIPTION OF THE EXEMPLARY EMBODIMENTS

Figure 1A:
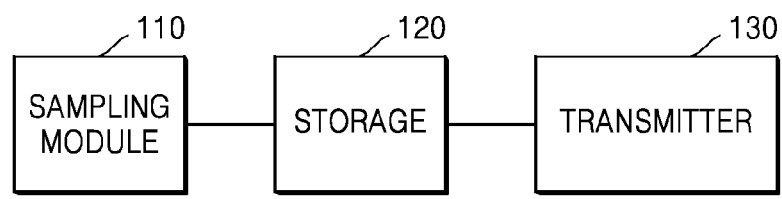
FIG. 1A is a block diagram of a device of providing sampled data used for diagnosing a display system of a terminal, according to an exemplary embodiment of the inventive concept.

In order to fully understand the operational advantages of the inventive concept and the objects achieved by the inventive concept, exemplary embodiments of the inventive concept will be described with reference to the accompanying drawings and the contents set forth therein.

The inventive concept may, however, be embodied in many different forms and should not be construed as being limited to the exemplary embodiments set forth herein; rather, these exemplary embodiments are provided so that this disclosure will be thorough and complete, and will fully convey the inventive concept to those of ordinary skill in the art. It should be understood, however, that there is no intent to limit the inventive concept to the particular forms disclosed, but on the contrary, the inventive concept is to cover all modifications, equivalents, and alternatives falling within the spirit and scope of the inventive concept. Like reference numerals denote like elements throughout the specification and drawings. In the drawings, the dimensions of structures are exaggerated for clarity of the inventive concept. As used herein, the term "and/or" includes any and all combinations of one or more of the associated listed items. Expressions such as "at least one of," when preceding a list of elements, modify the entire list of elements and do not modify the individual elements of the list.

The terminology used herein is for the purpose of describing particular embodiments only and is not intended to be limiting of the inventive concept. As used herein, the singular forms "a", "an", and "the" are intended to include the plural forms as well, unless the context clearly indicates otherwise. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1A is a block diagram of a device of providing sampled data used for diagnosing a display system of a terminal, according to an exemplary embodiment of the inventive concept. Examples of the terminal may include a smartphone, a tablet PC, a palm computer, and the like with a display system. For example, the display system described herein may be a display system running on Android.

As illustrated in FIG. 1A, the device of providing the sampled data used for diagnosing the display system of the terminal according to an exemplary embodiment of the inventive concept may include a sampling module 110, a storage 120, and a transmitter 130. The sampling module 110, the storage 120, and the transmitter 130 may implemented by a general purpose hardware processor such as a digital signal processor (DSP) and a field programmable gate array (FPGA), or a special purpose hardware processor such as an application specific integrated circuit (ASIC), may be completely implemented by a computer program in a software manner, or may be implemented by various modules in an application used for providing the sampled data of the display system installed in the terminal.

Specifically, the sampling module 110 may be configured to, under the control of a control side, sample the display system of the terminal at a sampling breakpoint used for sampling, and may acquire the sampled data used for diagnosing the display system of the terminal. In an exemplary embodiment, the display system of the terminal may be sampled at a predetermined frequency by the sampling module 110 at the sampling breakpoint. For example, the display system of the terminal may be sampled at a frequency of 60 Hz by the sampling module 110 at the sampling breakpoint.

The sampling breakpoint may be referred to as a location for sampling, which is set in a work layer of the display system. For example, the sampling breakpoint may be manually added to the work layer of the display system by a user at the terminal or the control side. Otherwise, the sampling breakpoint may be automatically added to the work layer of the display system by the terminal or the control side.

For example, the sampled data acquired by the sampling module 110 through sampling may include frame information or status information related to at least one application displayed by the display system. For example, the application displayed by the display system may include a status bar application (StatusBar Application), a navigation bar application (NavigationBar Application), a phase beam wallpaper application (PhaseBeamWallpaper Application), a main menu application (Launcher2launcher Application), an artist album browser interface application (ArtistAlbumBrowser-Activity Application), a surface view application (SurfaceView Application), and the like.

In addition, the frame information may include image information on a frame image of the at least one application displayed by the display system. For example, the frame information may include color values of each of pixels in the frame image. The status information may include parameters with respect to a working status of the at least one application. For example, the status information may include at least one of the following parameters: a name of an application (Application Name), pixel data of the frame image (Frame Pixel Data), a width of the frame image (Width), a height of the frame image (Height), the cropping of the frame image (Crop), a size of the frame image (Size), a memory usage of the terminal (MEM usage), and a central processing unit usage of the terminal (CPU usage).

Figure 1B:
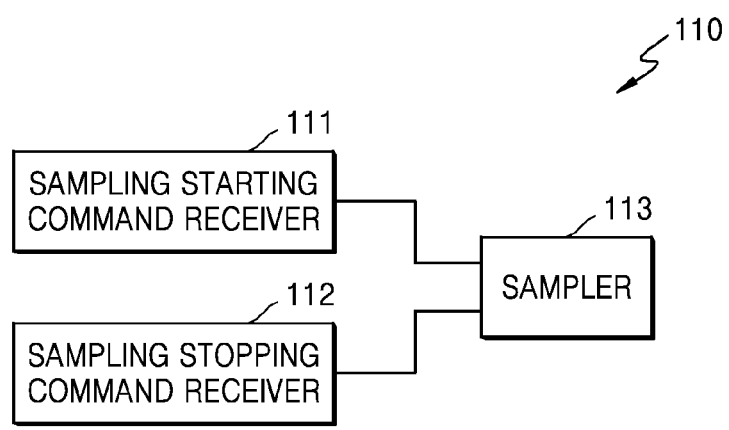
FIG. 1B is a block diagram of a sampling module of FIG. 1A, according to an exemplary embodiment.

FIG. 1B is a block diagram of the sampling module 110 of FIG. 1A.

Referring to FIG. 1B, the sampling module 110 may include a sampling starting command receiver 111 and a sampler 113.

Specifically, a sampling starting command used for starting sampling may be received from the control side by the sampling starting command receiver 111. For example, the sampling starting command may be received from the control side by the sampling starting command receiver 111 in a wireless or wired manner.

The sampler 113 may start sampling the display system at the sampling breakpoint in response to the received sampling starting command and may acquire the sampled data. In an exemplary embodiment, after the sampling starting command is received, the sampler 113 may sample the display system of the terminal at the sampling breakpoint at a predetermined frequency.

In addition, the sampling module 110 may include a sampling stopping command receiver 112.

Specifically, the sampling stopping command receiver 112 may be used to receive a sampling stopping command used for stopping sampling from the terminal. For example, the sampling stopping command may be received from the control side by the sampling stopping command receiver 112 in a wireless or wired manner.

Therefore, the sampler 113 may stop sampling the display system at the sampling breakpoint in response to the received sampling stopping command.

The storage 120 may store the sampled data acquired by the sampling module 110. For example, the storage 120 may store the sampled data acquired by the sampling module 110 in response to the received sampling stopping command. The storage 120 may be a memory that implements a storage function. However, a storage to store the sampled data acquired by the sampling module 110 may be provided separate from the device of providing the sampled data, in which case the storage 120 may be a simple buffer to relay the sampled data between the separate storage and the device of providing the sampled data.

The transmitter 130 may be used to transmit the sampled data stored in the storage 120 to the control side under the control of the control side.

Figure 1C:
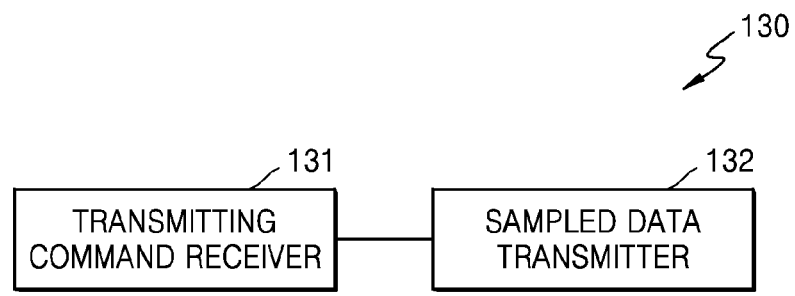
FIG. 1C is a block diagram of a transmitter of FIG. 1A, according to an exemplary embodiment.

FIG. 1C is a block diagram of the transmitter 130 of FIG. 1A.

Referring to FIG. 1C, the transmitter 130 may include a transmitting command receiver 131 and a sampled data transmitter 132.

Specifically, a transmitting command for transmitting the sampled data may be received from the control side by the transmitting command receiver 131. For example, the transmitting command for allowing the terminal to transmit the sampled data may be received in the wireless or wired manner from the control side by the transmitting command receiver 131.

The sampled data transmitter 132 may transmit the sampled data stored in the storage 120 to the control side in response to the received transmitting command.

In the device of providing the sampled data, according to an exemplary embodiment of the inventive concept, the sampled data used for diagnosing the display system of the terminal may be acquired and stored by the terminal under the control of the control side.

Furthermore, in order to acquire the sampled data more appropriately, a device described with reference to FIG. 1D may include a breakpoint adding module 105 in addition to the sampling module 110, the storage 120, and the transmitter 130.

Specifically, the breakpoint adding module 105 may add the sampling breakpoint to the work layer of the display system. In an exemplary embodiment, the work layer may include an application framework layer (Framework layer), a hardware abstraction layer (HAL), and an operating system kernel layer (Kernel layer). In an exemplary embodiment, at least one sampling breakpoint may be added to each work layer by the breakpoint adding module 105.

Therefore, the sampler 113 of the sampling module 110 may start sampling the display system at the added sampling breakpoint in response to the sampling starting command received by the sampling starting command receiver 111.

Figure 2A:
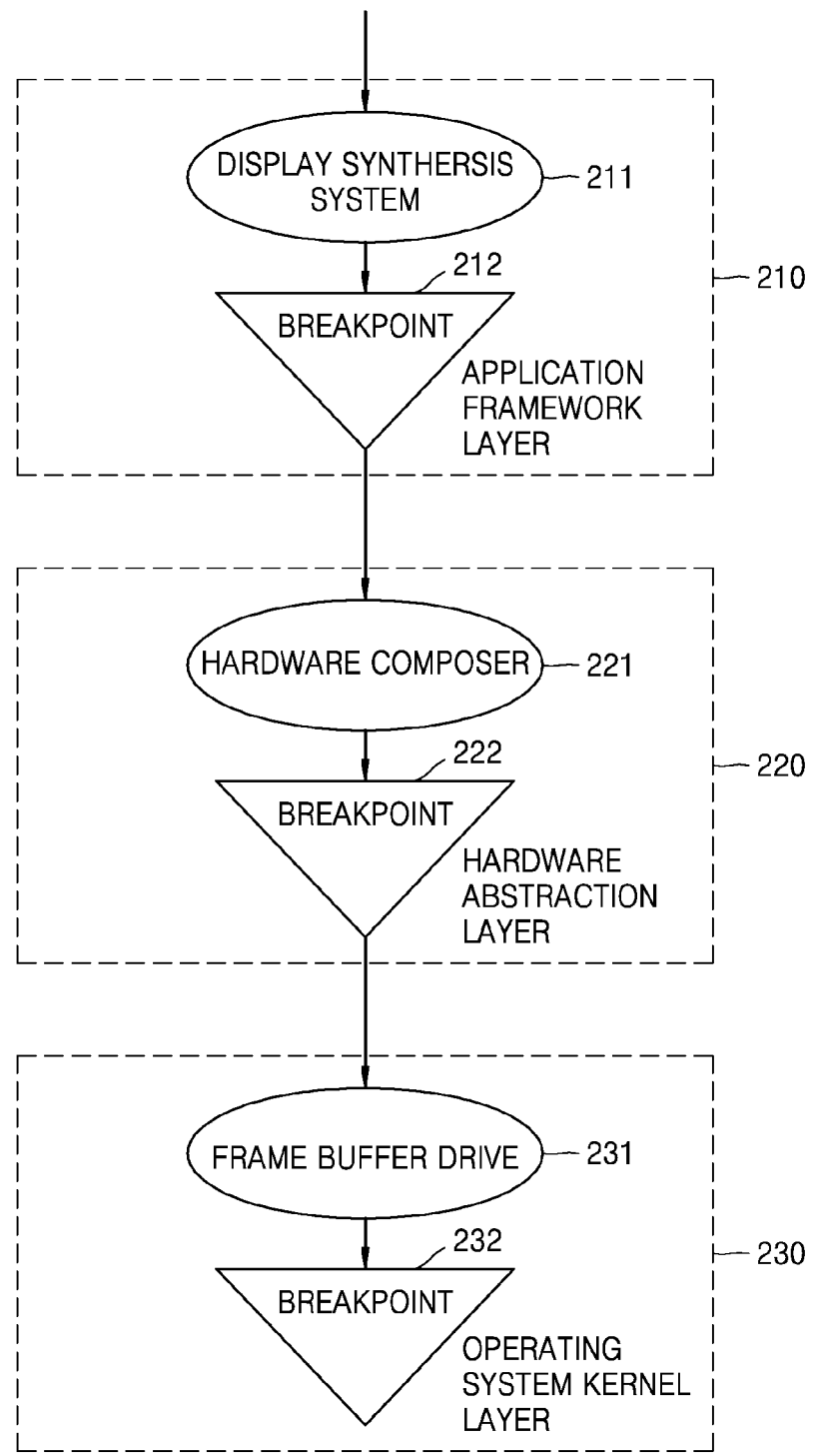
FIG. 2A is a flowchart of a process of adding a sampling breakpoint, according to an exemplary embodiment.

FIG. 2A is a flowchart of a process of adding a sampling breakpoint, according to an exemplary embodiment of the inventive concept.

Figure 1D:
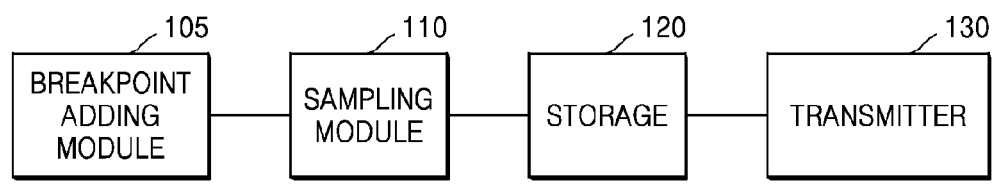
FIG. 1D is a block diagram of a breakpoint adding module added to the device of FIG. 1A, according to an exemplary embodiment.

As illustrated in FIG. 2A, one sampling breakpoint may be added to each work layer (an application framework layer 210, a hardware abstraction layer 220, and an operating system kernel layer 230) by the breakpoint adding module 105 of FIG. 1D.

Specifically, a main function of the application framework layer 210 may be to display a synthesis system 211 (SurfaceFlinger). That is, the SurfaceFlinger may receive graphic interface information corresponding to at least one application displayed by the display system (each application may correspond to one or more graphic interfaces). The SurfaceFlinger may calculate locations of each graphical interface in an image to be synthesized eventually, the display parameters (the display parameters after subtracting regions covered by upper level images from original visible regions of the graphical interface) according to parameters such as Z-order (that is, assuming that there exists a Z-axis in a direction perpendicular to a screen plane, front-and-back locations of the graphical interface may be determined according to Z-coordinates of all the graphical interfaces for ease of describing up-and-down coverage relationships between respective graphical interfaces, and the order of the graphical interfaces on the Z-axis may be referred to as Z-order), and the transparency, size and location of the graphical interface included in the graphical interface information, and may combine all of the graphical interfaces into one main interface (that is, the interface visible to a user). Therefore, in order to acquire data of respective applications during an image depicting process, a sampling breakpoint 212 may be added to the application framework layer 210 at a service of the SurfaceFlinger. For example, in order to learn whether the update of each the application is accurate per refreshment, the breakpoint adding module 105 may add the sampling breakpoint to a SurfaceFlinger::handleMessageRefresh( ) function (a function to process a refresh event).

A main function of the hardware abstraction layer 220 may be to synthesize the display parameters of the graphic interface eventually calculated into one display buffer by SurfaceFlinger. Since the display parameters may be synthesized by a hardware composer (HWComposer) 221, a sampling breakpoint 222 may be added to the processing result of the HWComposer 221 by the breakpoint adding module 105 so as to acquire data of respective levels of the graphic interfaces processed by the HWComposer 221. For example, in order to confirm whether synthesis results of respective levels are accurate, the sampling breakpoint 222 may be added to a doComposition function (a synthesis processing function) by the breakpoint adding module 105.

The operating system kernel layer 230 may mainly operate as a frame buffer drive 231. That is, the frame buffer drive 231 may drive a display apparatus with a display buffer including complete display parameters. Specifically, the frame buffer drive may be a type of a driving program interface in a kernel and may abstract a frame buffer from the display apparatus. The frame buffer may be considered as one image of the display buffer. After the frame buffer is mapped in a process address space, a reading and/or writing operations may be directly performed. The writing operation may be reflected on a screen immediately. That is, data written to the frame buffer may be displayed on the screen in the patterns of pixels immediately. Therefore, in order to acquire display status data in each frame buffer every moment, the breakpoint adding module 105 may add a sampling breakpoint 232 at vertical synchronization (Vsync). In order to confirm whether a display result of the screen is accurate, for example, the breakpoint adding module 105 may add the sampling breakpoint 232 to an fb_pan_display function (a function that processes the refreshment of a liquid crystal display) at the Vsync.

Figure 2B:
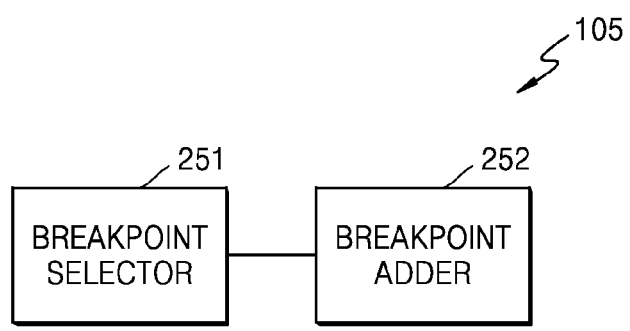
FIG. 2B is a block diagram of the breakpoint adding module of FIG. 1D, according to an exemplary embodiment.

FIG. 2B is a block diagram of the breakpoint adding module 105 of FIG. 1D.

Referring to FIG. 2B, the breakpoint adding module 105 may include a breakpoint selector 251 and a breakpoint adder 252.

Specifically, the breakpoint selector 251 may be used to select at least one sampling breakpoint to be added from the predetermined number of the sampling breakpoints. The predetermined number of the sampling breakpoints may correspond to the application framework layer 210, the hardware abstraction layer 220, and the operating system kernel layer 230. Generally, as illustrated in FIG. 2A, the process of adding the sampling breakpoint may satisfy a user's demand for diagnosis. However, in some instances, when the user wants to obtain a diagnosis result more rapidly, it may be necessary to add more sampling breakpoints to a corresponding work layer. Therefore, in order to facilitate the user in adding different sampling breakpoints according to the need, a plurality of sampling breakpoints may be preset to satisfy demands of other users. The plurality of sampling breakpoints may be added to the application framework layer 210, the hardware abstraction layer 220, or the operating system kernel layer 230. The breakpoint selector 251 may select sampling breakpoints to be added according to a user's request.

The breakpoint adder 252 may be used to add the selected at least one sampling breakpoint. The at least sampling breakpoint selected by the breakpoint selector 251 may be added to the work layer corresponding to each sampling breakpoint.

Figure 2C:
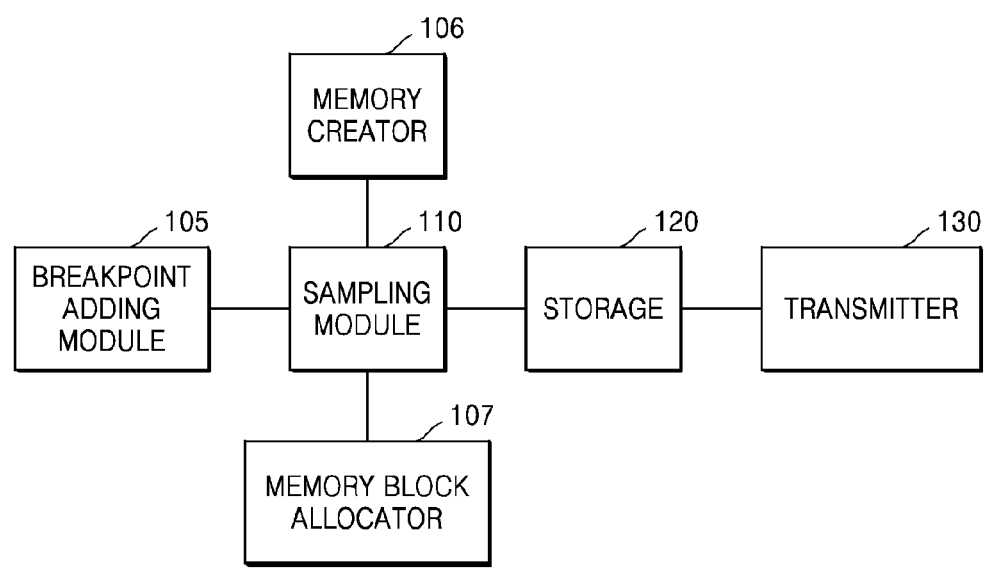
FIG. 2C is a block diagram of a memory creator and a memory block allocator added to a device of FIG. 1D.

In addition, in order to avoid affecting fluency of the display system, it is required to sample the display system at the sampling breakpoint rapidly. However, the sampled data acquired through sampling is generally large in size (for example, in the case of a liquid crystal display having a resolution ratio of about 720p, a size of the sampled data is about 3 Megabyte). In order to store the sampled data that requires a large storage space, a device described with reference to FIG. 2C may include a memory creator 106, and a memory block allocator 107 in addition to the sampling module 110, the storage 120, the transmitter 130, and the breakpoint adding module 105.

Specifically, the memory creator 106 may be used to create a memory pool used for storing the sampled data. The memory pool may include a plurality of memory blocks. For example, in order to create the memory pool for storing the sampled data, the memory creator 106 may apply for a part from a memory of the terminal.

The memory block allocator 107 may be used to allocate a memory block for storing the sampled data to each sampling breakpoint added by the breakpoint adder 105. The sampled data may be acquired at the sampling breakpoint through sampling. Moreover, when the sampled data is acquired at each sampling breakpoint by the sampling module 110 through sampling, the acquired sampled data may be stored in the memory block allocated to the sampling breakpoint, according to a circular linked list mechanism.

Therefore, the sampling module 110 stops the sampling, and the sampled data stored in each memory block may be stored in the storage 120.

Figure 3:
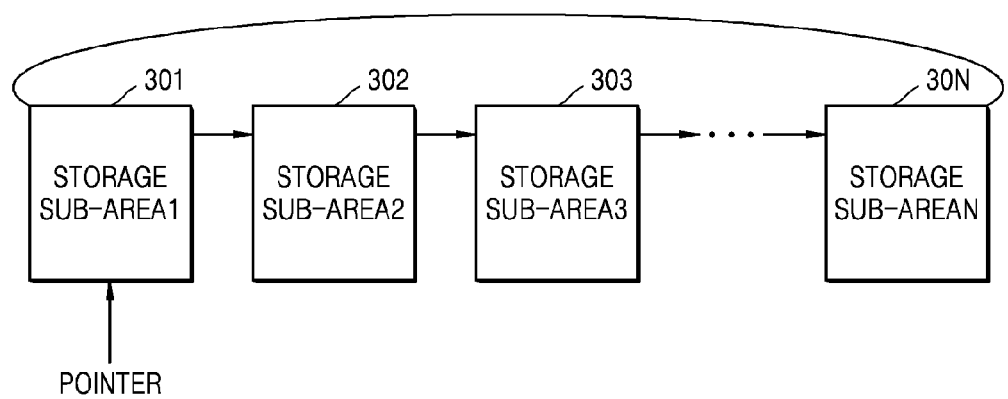
FIG. 3 is a block diagram of describing a circle-linked list storage mechanism, according to an exemplary embodiment.

FIG. 3 is a block diagram of describing a circle-linked list storage mechanism according to an exemplary embodiment of the inventive concept.

As described with reference to FIG. 3, the memory blocks allocated to the sampling breakpoint may be divided into N storage sub-areas 301, 302, 303, and 30N according to the size of the sampled data, where N is a natural number larger than 1. The N storage sub-areas may form a linked list. Starting from a head (storage sub-area 1 301) of the linked list, the sampled data acquired through each sampling may be sequentially stored in one of the storage sub-areas. For example, as illustrated in FIG. 3, the pointer of the linked list points to a storage sub-area 1 301, and sampled data acquired through first sampling will be stored in storage sub-area 1 301 in that way. At this time, the pointer of the linked list may move and then point to storage sub-area 2 302. Therefore, sampled data acquired through second sampling will be stored in storage sub-area 2 302. Similarly, the pointer of the linked list may keep on moving and then point to storage sub-area 3 303. Therefore, sampled data acquired through third sampling will be stored in storage sub-area 3 303. After sampled data acquired through N sampling is stored in storage sub-area N 30N, the pointer of the linked list will point to the head (that is, storage sub-area 1 301). Therefore, starting from the head of the linked list, pieces of sampled data acquired through subsequent samplings may be continuously sequentially stored in corresponding storage sub-areas in ascending order of the storage sub-areas. That is, storage sub-areas 1 to N 301 to 30N may store the pieces of data circularly acquired through sampling, only each of the storage sub-areas may store the latest stored sampled data.

Figure 4:
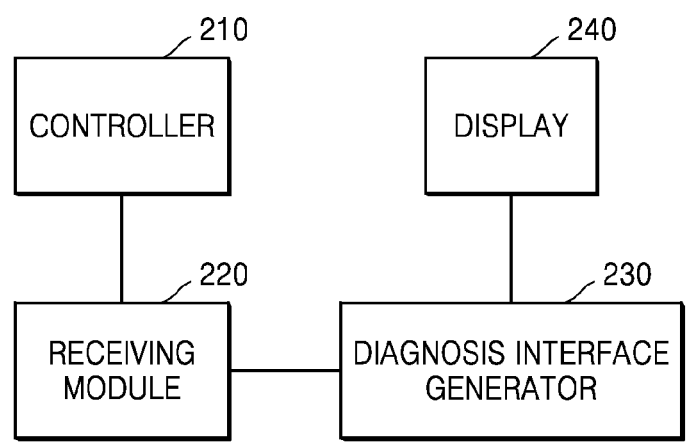
FIG. 4 is a block diagram of a device of displaying a diagnosis interface used for diagnosing a display system of a terminal at a control side, according to an exemplary embodiment.

FIG. 4 is a block diagram of a device of displaying a diagnosis interface used for diagnosing a display system of a terminal at a control side, according to an exemplary embodiment of the inventive concept. For example, the control side may be an electronic device capable of displaying the diagnosis interface, such as a computer, a smartphone, or a tablet PC.

As illustrated in FIG. 4, the device of displaying the diagnosis interface used for diagnosing the display system of the terminal at the control side according to the exemplary embodiment of the inventive concept may include a controller 210, a receiving module 220, a diagnosis interface generating module 230, and a display 240. These elements 210, 220, 230, and 240 may be implemented by a display for performing a specific function, may be implemented by a general purpose hardware processor such as a DSP or an FPGA or a special purpose hardware processor such as an ASIC, or may be completely implemented in a software manner by a computer program (for example, may be implemented by various modules in an application program for displaying the diagnosis interface installed in the terminal).

Specifically, the controller 210 may be used to control the terminal to sample the display system of the terminal. The controller 210 may control the terminal to start or stop sampling the display system of the terminal at a sampling breakpoint used for sampling.

According to an exemplary embodiment of the inventive concept, the device of displaying the diagnosis interface as shown in FIG. 4 may further include the device of providing sampled data as shown in FIG. 1A so that the sampled data acquired at the device of providing the sampled data is used at the device of displaying the diagnosis interface based on the sampled data.

Figure 5:
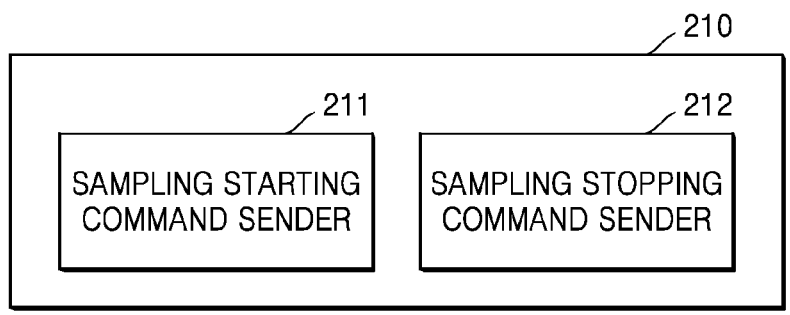
FIG. 5 is a block diagram of a controller in a device of displaying a diagnosis interface used for diagnosing a display system of a terminal at a control side, according to an exemplary embodiment.

FIG. 5 is a block diagram of a controller 210 in a device displaying a diagnosis interface used for diagnosing a display system of a terminal at a control side, according to an exemplary embodiment of the inventive concept. Referring to FIG. 5, the controller 210 may include a sampling starting commander sender 211 and a sampling stopping command sender 212.

Specifically, the sampling starting command sender 211 may be used to generate a sampling starting command and send the generated sampling starting command to the terminal, and may control the terminal to start sampling the display system at the sampling breakpoint.

In an exemplary embodiment, the sampling starting command sender 211 may receive a starting request for controlling the terminal to start sampling and may generate the sampling starting command according to the starting request. In this case, the sampling starting command sender 211 may provide the convenience of a user manually controlling the terminal such that the terminal starts sampling the display system at the sampling breakpoint. For example, the sampling starting command sender 211 may provide an associated button to facilitate the user in inputting the starting request.

The sampling stopping command sender 212 may be used to generate a sampling stopping command and send the generated sampling stopping command to the terminal, and may control the terminal to stop sampling the display system at the sampling breakpoint.

In an exemplary embodiment, the sampling stopping command sender 212 may receive a stopping request for controlling the terminal to stop the sampling and may generate the sampling stopping command according to the stopping request. In this case, the sampling stopping command sender 212 may provide the convenience of a user manually controlling the terminal such that the terminal stops sampling the display system at the sampling breakpoint. For example, the sampling stopping command sender 212 may provide an associated button to facilitate the user in inputting the stopping request.

Figure 6A:
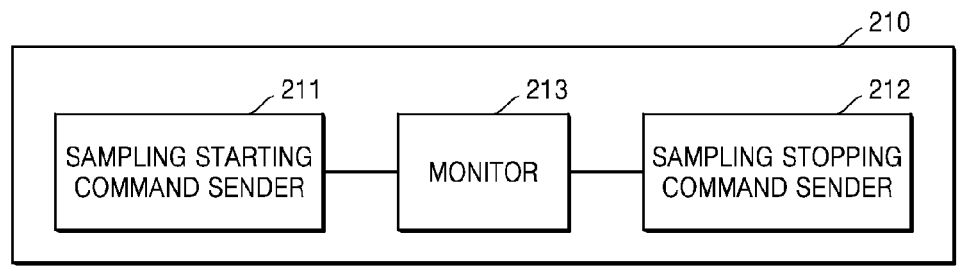
FIG. 6A is a block diagram of a controller in a device of displaying a diagnosis interface used for diagnosing a display system of a terminal at a control side, according to another exemplary embodiment.

FIG. 6A is a block diagram of a controller 210 in a device of displaying a diagnosis interface used for diagnosing a display system of a terminal at a control side, according to another exemplary embodiment of the inventive concept. Referring to FIG. 6A, the controller 210 may further include a monitor 213 in addition to the sampling starting commander sender 211 and the sampling stopping command sender 212 described with reference to FIG. 5.

Specifically, the monitor 213 may be used to monitor whether any event causing an abnormal display occurs in the terminal during a working process. In an exemplary embodiment, an event causing an abnormal display may include at least one of memory overflow of the terminal, CPU overuse of the terminal, interruption of a network accessed by the terminal, user interface (UI) sliding of the terminal, and Application Not Responding (ANR) of the terminal. These events may cause different kinds of abnormal display. For example, the memory overflow of the terminal and the CPU overuse in the terminal may cause screen not responding of the terminal, the interruption of the network accessed by the terminal may cause a picture to be stopped while the terminal plays a video, the UI sliding of the terminal may cause a blurred screen of the terminal, and the ANR of the terminal may cause a stopped screen picture of the terminal.

Therefore, when the above events are monitored by the monitor 213, the sampling starting command sender 211 may generate a sampling starting command. In this case, the sampling starting command sender 211 may automatically control the terminal according to an event such that the terminal starts sampling the display system at the sampling breakpoint. For example, when the event of the memory flow of the terminal is monitored by the monitor 213, the sampling starting command sender 211 may generate the sampling starting command.

When an event monitored by the monitor 213 is terminated or the duration of the event is longer than a predetermined period of time, the sampling stopping command sender 212 may generate a sampling stopping command. In this case, the sampling stopping command sender 212 may automatically control the terminal according to the event such that the terminal stops sampling the display system at the sampling breakpoint. For example, when the duration of the event of the memory overflow of the terminal monitored by the monitor 213 is longer than a predetermined period of time, the sampling stopping command sender 212 may generate the sampling stopping command.

Referring to FIG. 4 again, the receiving module 220 may be used to receive the sampled data acquired through sampling from the terminal. In an exemplary embodiment, the sampled data may be sampled data acquired through sampling of the display system at the sampling breakpoint used for sampling at a predetermined frequency by the terminal, and may include frame information and status information, which are related to at least one application displayed by the display system.

In addition, the frame information may include image information of a frame image of the at least one application displayed by the display system. For example, the frame information may include a color value of each pixel in the frame image. The status information may include parameters about a working status of the at least one application. For example, the status information may include at least one of the following parameters: the name of the application, the pixel data of the frame image, the width of the frame image, the height of the frame image, the cropping of the frame image, the size of the frame image, the memory usage of the terminal, and the CPU usage of the terminal.

Figure 6B:
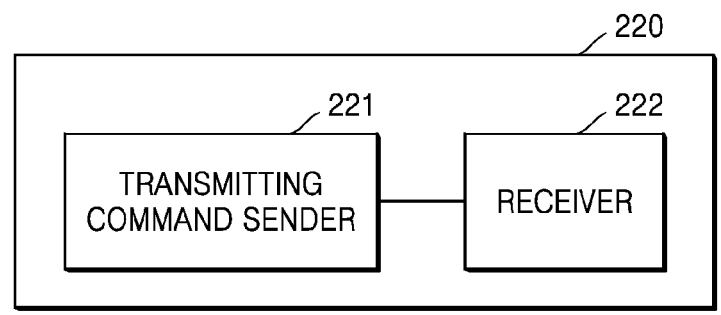
FIG. 6B is a block diagram of a receiving module of FIG. 4, according to an exemplary embodiment.

FIG. 6B is a block diagram of the receiving module 220 of FIG. 4.

Referring to FIG. 6B, the receiving module 220 may include a transmitting command sender 221 and a receiver 222.

Specifically, in order to control the terminal to transmit sampled data, the transmitting command sender 221 may be used to generate a transmitting command and send the generated transmitting command to the terminal. In an exemplary embodiment, the transmitting command sender 221 may receive a user-input transmitting request for transmitting the sampled data and may generate the transmitting command according to the user-input transmitting request. In another exemplary embodiment, when a sampling stopping command is sent by the sampling stopping command sender 212, the transmitting command sender 221 may generate the transmitting command.

The receiver 22 may be used to receive the sampled data that is acquired through sampling and is transmitted according to the transmitting command by the terminal.

The diagnosis interface generator 230 may be used to create the diagnosis interface for diagnosing the display system of the terminal based on the sampled data. In an exemplary embodiment, the diagnosis interface may include an image diagnosis window and a status diagnosis window. The image diagnosis window displays a frame image with respect to an application to be diagnosed, and the status diagnosis window displays a working status with respect to the application that is being under diagnosis. Alternatively, the diagnosis interface may include a frame image and a working status of an abnormal application, which are acquired through an analysis of an expert system, and the corresponding image diagnosis window and status diagnosis window may be disposed in a visual manner.

Figure 7:
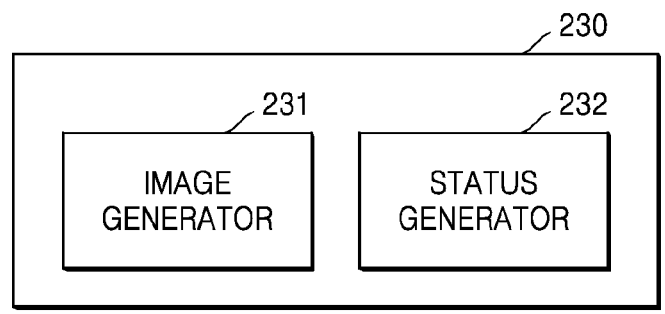
FIG. 7 is a block diagram of a diagnosis generator in a device of displaying a diagnosis interface used for diagnosing a display system of a terminal at a control side, according to an exemplary embodiment.

FIG. 7 is a block diagram of a diagnosis generator 230 in a device of displaying a diagnosis interface used for diagnosing a display system of a terminal at a control side, according to an exemplary embodiment of the inventive concept. Referring to FIG. 7, the diagnosis interface generator 230 may include an image generator 231 and a status generator 232.

Specifically, the image generator 231 may generate an image diagnosis window based on frame information of an application that is being under diagnosis.

The status generator 232 may generate a status diagnosis window based on status information of the application that is being under diagnosis.

Figure 8:
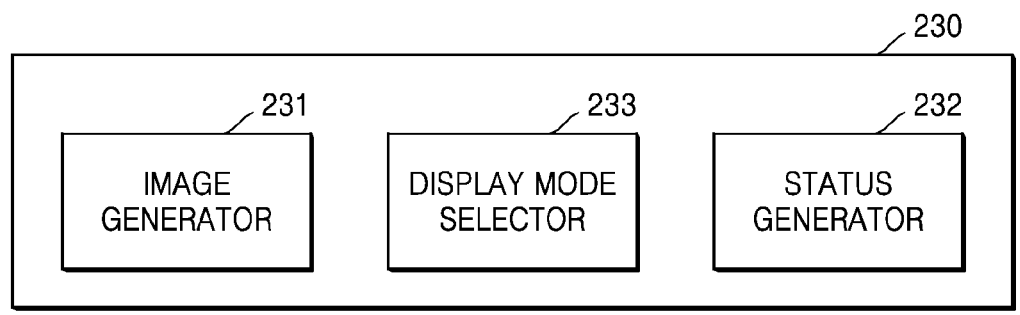
FIG. 8 is a block diagram of a diagnosis generator in a device of displaying a diagnosis interface used for diagnosing a display system of a terminal at a control side, according to another exemplary embodiment.

FIG. 8 is a block diagram of a diagnosis generator 230 in a device of displaying a diagnosis interface used for diagnosing a display system of a terminal at a control side, according to another exemplary embodiment of the inventive concept. Referring to FIG. 8, the diagnosis interface generator 230 may include a display mode selector 233 in addition to the image generator 231 and the status generator 232 of FIG. 7.

Specifically, the display mode selector 233 may be used to selecting a static display mode or a dynamic display mode. For example, the display mode selector 233 may provide a button used for selecting a display mode to a user to receive the selection of the display mode by the user.

Specifically, in the static display mode, an application to be diagnosed may include at least one application displayed by the display system. An image diagnosis window and a status diagnosis window may display a frame image and a working status which related to the at least one application at a predetermined time, respectively. In the dynamic display mode, the application to be diagnosed may include a predetermined application of the at least one application. The image diagnosis window and the status diagnosis window may display a frame image and a working status which are related to the at least one application for a predetermined period of time, respectively.

Therefore, the image generator 231 may generate the image diagnosis window according to the static display mode or the dynamic display mode selected by the display mode selector 233. In an exemplary embodiment, when the static display mode is selected by the display mode selector 233, the image generator 231 may generate the image diagnosis window based on the frame information of the at least one application acquired at the predetermined time. In another exemplary embodiment, when the dynamic display mode is selected by the display mode selector 233, the image generator 231 may generate the image diagnosis window based on the frame information of the at least one application acquired during the predetermined period of time.

Moreover, the status generator 232 may generate the status diagnosis window according to the static display mode or the dynamic display mode selected by the display mode selector 233. In an exemplary embodiment, when the static display mode is selected by the display mode selector 233, the image generator 232 may generate the status diagnosis window based on the frame information of the at least one application acquired at the predetermined time. In another exemplary embodiment, when the dynamic display mode is selected by the display mode selector 233, the image generator 232 may generate the status diagnosis window based on the frame information of the at least one application acquired during the predetermined period of time.

In addition, in order to facilitate the selection of the predetermined time, when the selected display mode is the static display mode, the display mode selector 233 may also be used to select the predetermined time for the static display mode. On the contrary, in order to facilitate the selection of the predetermined period of time, when the selected display mode is the static display mode, the display mode selector 233 may also be used to selecting the predetermined period of time for the dynamic display mode.

In an exemplary embodiment, the display mode selector 233 may select the predetermined time or the predetermined period of time according to a user input. For example, the display mode selector 233 may provide a list of sampling time to a user, may receive a specific time selected from the list by the user, and may determine the specific time selected by the user as the predetermined time (or, may receive a specific period of time selected from the list by the user appearing at the specific time and may determine the specific period of time selected by the user as the predetermined period of time).

In addition, the display mode selector 233 may be used to select the predetermined application for the dynamic display mode from the at least one application displayed by the display system of the terminal. The display mode selector 233 may select one of the at least one application displayed by the display system of the terminal as the predetermined application for dynamic displaying. For example, the display mode selector 233 may provide a list of the at least one application to the user and may select the predetermined application according to the selection of the application in the list by the user.

Referring to FIG. 4 again, the display 240 may be used to display the diagnosis interface generated by the diagnosis generator 230. In an exemplary embodiment, the display 240 may display the image diagnosis window and the status diagnosis window to the user. The image diagnosis window and the status diagnosis window are generated by the image generator 231 and the status generator 232, respectively.

Figure 9:
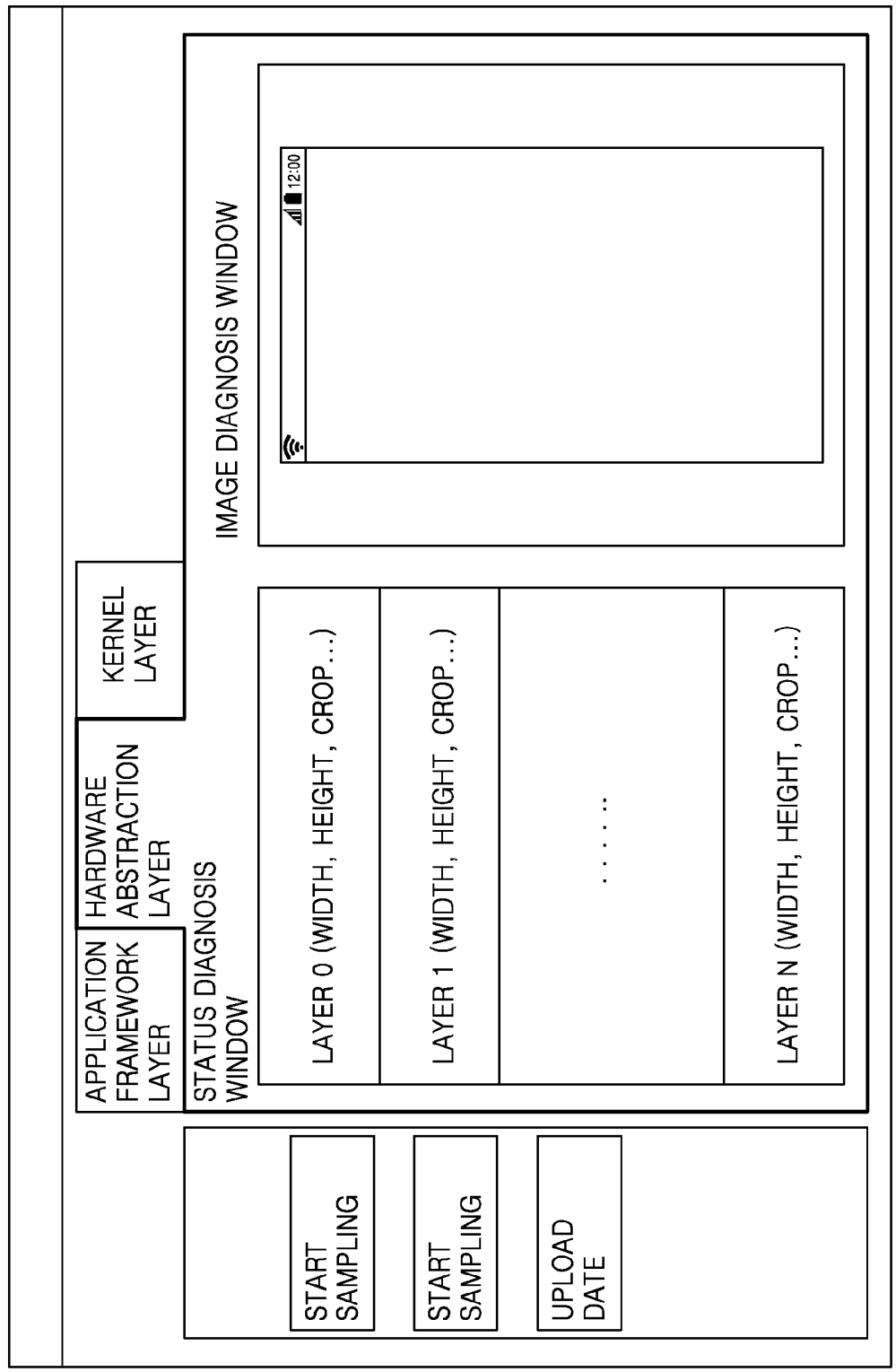
FIG. 9 is a diagram for describing a diagnosis interface according to an exemplary embodiment.

FIG. 9 is a diagram for describing a diagnosis interface according to an exemplary embodiment of the inventive concept.

As illustrated in FIG. 9, a right window of the diagnosis interface may be an image diagnosis window generated by the image generator 231, and a frame image may be displayed on the image diagnosis window. A middle window of the diagnosis interface may be the status diagnosis window generated by the status generator 232, and a working status of the application that is being under diagnosis may be displayed on the status diagnosis window in FIG. 9. In addition, as illustrated in FIG. 9, the diagnosis interface may further include a work layer selection button ("application framework layer", "hardware abstraction layer" and "kernel layer") used for selecting a work layer, a button (start sampling) used for receiving the starting request for controlling the terminal to start sampling, a button (stop sampling) used for receiving the stopping request for controlling the terminal to stop sampling, and a button (upload data) used for receiving a data uploading request.

It is to be understood that the diagnosis interface displayed by the display 240 is not limited to the diagnosis interface illustrated in FIG. 9, and may be another diagnosis interface provided according to actual demands, for example, a diagnosis interface having a button used for selecting the display mode and a diagnosis interface having an image diagnosis window that may display a plurality of frame images at the same time. Moreover, the arrangement of the image diagnosis window and the status diagnosis window is not limited to the left-and-right arrangement illustrated in FIG. 9, and may be another kind of arrangement provided according to actual demands, for example, an up-and-down arrangement or an arrangement with the status diagnosis window surrounded by the image diagnosis window.

Figure 10:
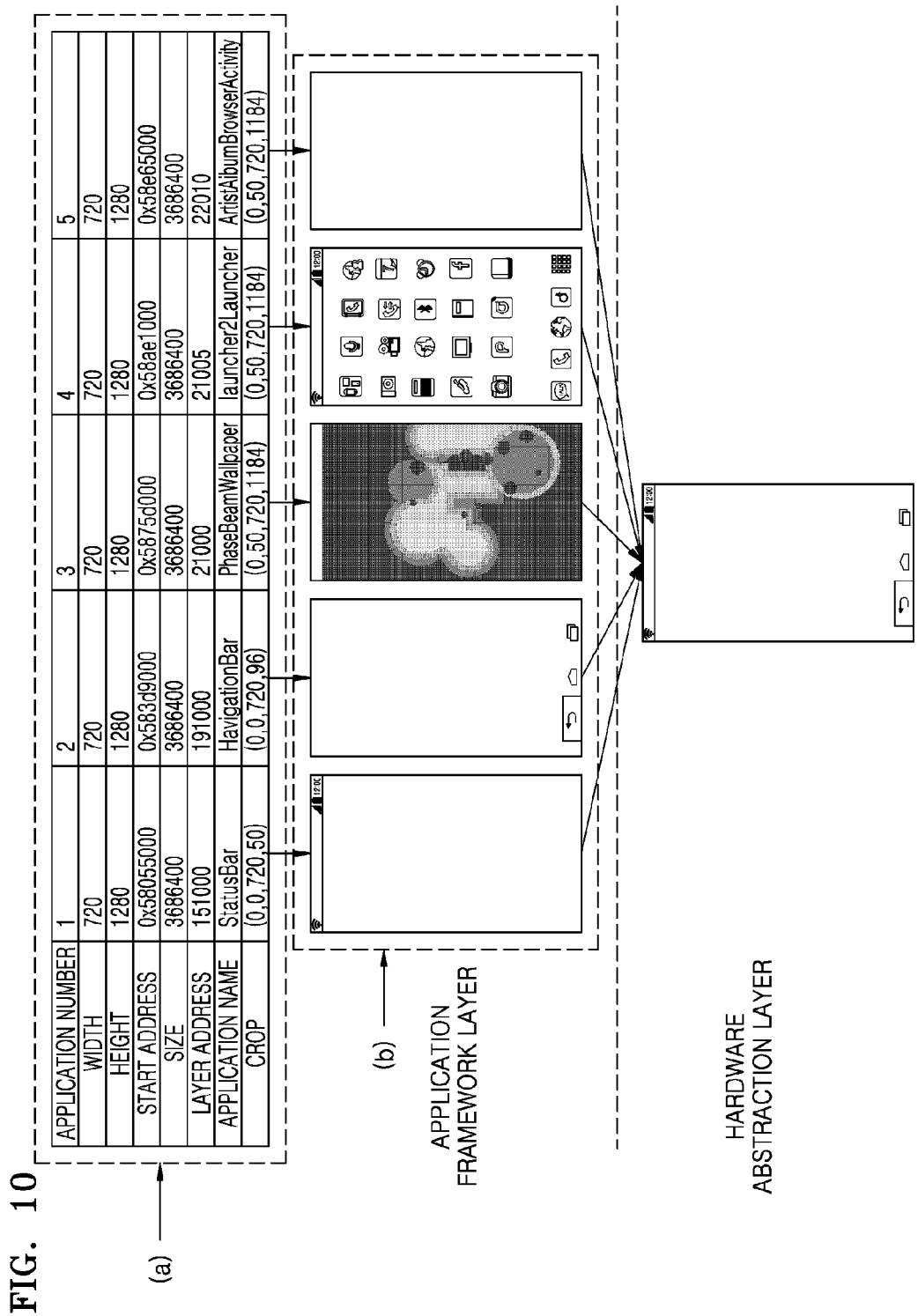
FIG. 10 is a diagram for describing a static display mode according to an exemplary embodiment.

FIG. 10 is a diagram for describing a static display mode according to an exemplary embodiment of the inventive concept.

As illustrated in FIG. 10, an abnormal display (a blank screen (the bottom of FIG. 10)) has been found in the hardware abstraction layer. Therefore, it is necessary to immediately find a reason for the abnormal display in the application framework layer above the hardware abstraction layer. The static display mode may be selected to display an image diagnosis window ((b) of FIG. 10) and a status diagnosis window ((a) of FIG. 10) of all the applications in the application framework layer at a time when the blank screen failure occurs.

As can be seen from the diagnosis interface ((a) and (b) in FIG. 10) in the static display mode of FIG. 10, an application (StatusBar) for generating a status bar has generated a status bar correctly, an application (NavigationBar) for generating a navigation bar has generated a navigation bar correctly, an application (PhaseBeamWallpaper) for generating a live wallpaper has generated a live wallpaper correctly, and an application (Launcher2launcher) for generating a main menu has generated a main menu correctly. However, an application (ArtistAlbumBrowserActivity) for generating a browsing interface has not generated a browsing interface correctly, and thus the blank screen has been generated. Therefore, it may be determined that the blank screen occurring in the hardware abstraction layer is caused by the blank screen generated by the ArtistAlbumBrowserActivity application based on the static display interface of the application framework layer.

It is to be understood that the arrow signs are added in the figure for the purpose of depicting the correspondence between the image diagnosis window and the status diagnosis window and may be deleted from the actually displayed diagnosis interface.

Figure 11:
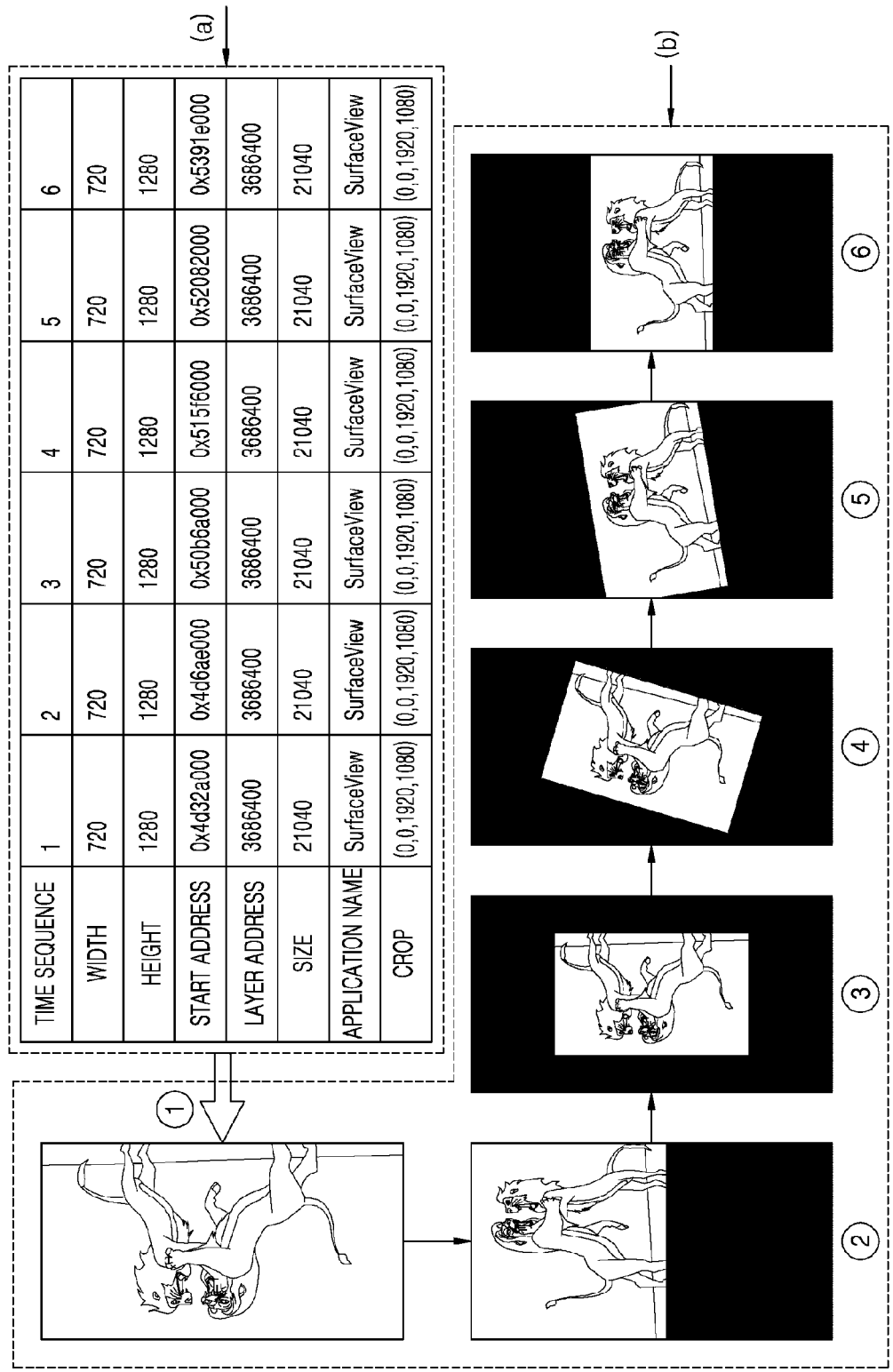
FIG. 11 is a diagram for describing a dynamic display mode according to an exemplary embodiment.

FIG. 11 is a diagram for describing a dynamic display mode according to an exemplary embodiment of the inventive concept.

An image diagnosis window ((b) of FIG. 11, that is, a window including six frame images numbered from 1 to 6) and a status diagnosis window (see (a) of FIG. 11) of an application (SurfaceView) are illustrated in FIG. 11. The SurfaceView application generates a surface view during a blinking screen failure caused by a switching between a landscape mode and a portrait mode in the process of playing a video. In FIG. 11, the predetermined period of time for the dynamic display mode may be the duration of displaying frame images 1 to 6 on the screen of the terminal.

As can be learned for the dynamic analysis on the SurfaceView application of FIG. 11, frame image 2 may be an abnormal frame. Therefore, it may be determined that the blinking screen occurring in the process of switching between the landscape mode and the portrait mode is caused by the SurfaceView application itself. In this case, the user may find out the causes of the blinking screen through some additional analyses with respect to the SurfaceView application.

The arrow signs are added in FIG. 11 for the purpose of depicting the correspondence between the image diagnosis window and the status diagnosis window and depicting the time sequence of the frame images and may be deleted from the actually displayed diagnosis interface.

In the device of displaying the diagnosis interface, according to an exemplary embodiment of the inventive concept, an intuitional diagnosis interface may be generated based on the sampled data at the control side, and the efficiency of the display system of the user diagnosis terminal may be improved effectively.

Hereinafter, a method of providing sampled data used for diagnosing a display system of a terminal at the terminal according to an exemplary embodiment of the inventive concept will be described with reference to FIG. 12A. The method may be performed by the device as described with reference to FIG. 1A or by a computer program. For example, the method may be performed by an application installed in the terminal, which is used for providing the sampled data of the display system.

Figure 12A:
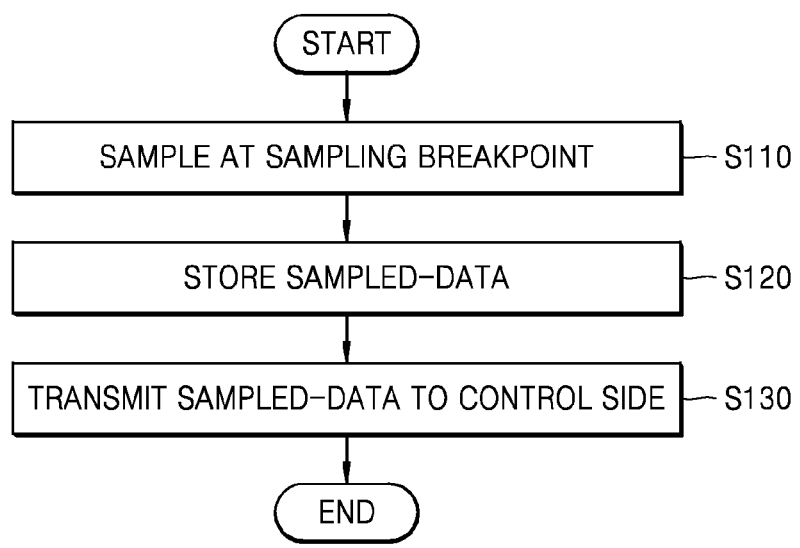
FIG. 12A is a flowchart of a method of providing sampled data used for diagnosing a display system of a terminal, according to an exemplary embodiment.

FIG. 12A is a flowchart of the method for providing the sampled data used in diagnosing the display system of the terminal at the terminal, according to an exemplary embodiment of the inventive concept.

Referring to FIG. 12A, in operation S110, in order to acquire the sampled data used for diagnosing the display system of the terminal, under the control of a control side, the display system of the terminal may be sampled at the sampling breakpoint used for sampling.

The sampling breakpoint may refer to a location for sampling, which is set in a work layer of the display system. In an exemplary embodiment, the sampling breakpoint may be manually added to the work layer of the display system by a user at the terminal or the control side or may be automatically added to the work layer of the display system by the terminal or the control side.

In an exemplary embodiment, the sampled data acquired through sampling may include frame information and status information related to at least one application displayed by the display system.

Figure 12B:
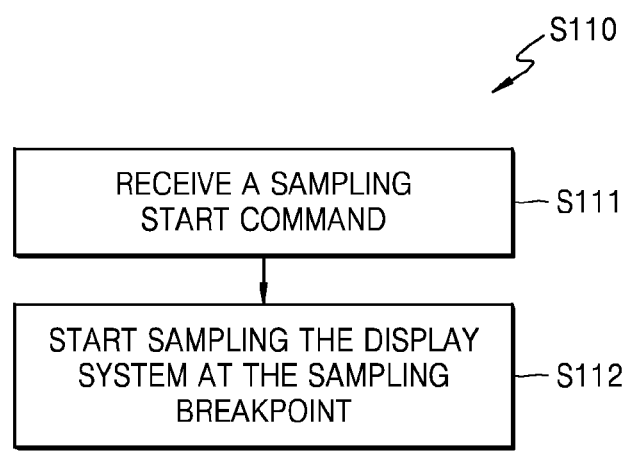
FIG. 12B is a flowchart of operation S110 of sampling a display system at a sampling breaking point of FIG. 12A, according to an exemplary embodiment.

FIG. 12B is a flowchart of operation S110 of sampling a display system at a sampling breaking point of FIG. 12A, according to an exemplary embodiment of the inventive concept.

Referring to FIG. 12B, operation S110 may include operation S111 of receiving a sampling starting command and operation S112 of starting sampling the display system at the sampling breakpoint.

Specifically, operation S111 of receiving the sampling starting command may include receiving the sampling starting command used for starting sampling from the control side.

Operation S112 of starting sampling the display system at the sampling breakpoint may include starting sampling the display system at the sampling breakpoint in response to the received sampling starting command to acquire the sampled data.

Figure 12C:
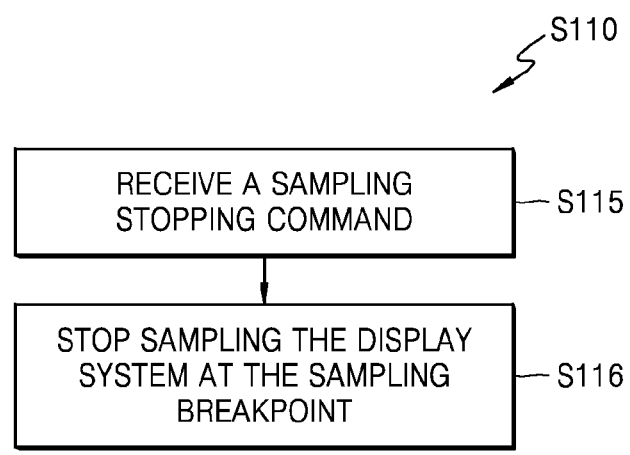
FIG. 12C is a block diagram of operation S110 of sampling a display system at a sampling breaking point of FIG. 12A, according to another exemplary embodiment.

FIG. 12C is a block diagram of operation S110 of sampling a display system at a sampling breaking point of FIG. 12A, according to another exemplary embodiment of the inventive concept.

Referring to FIG. 12C, operation S110 may further include operation S115 of receiving a sampling stopping command and operation S116 of stopping sampling the display system at the sampling breakpoint.

Specifically, operation S115 of receiving the sampling stopping command may include receiving the sampling stopping command used for stopping sampling from the control side.

Operation S116 of stopping sampling the display system at the sampling breakpoint may include stopping sampling the display system at the sampling breakpoint in response to the received sampling stopping command.

In operation S120 of FIG. 12A, the acquired sampled data may be stored. For example, the acquired sampled data may be stored in response to the received sampling stopping command. The acquired sampled data may be stored in a memory with a storage function.

In operation S130 of FIG. 12A, the stored sampled data may be transmitted to the control side under the control of the control side.

Figure 12D:
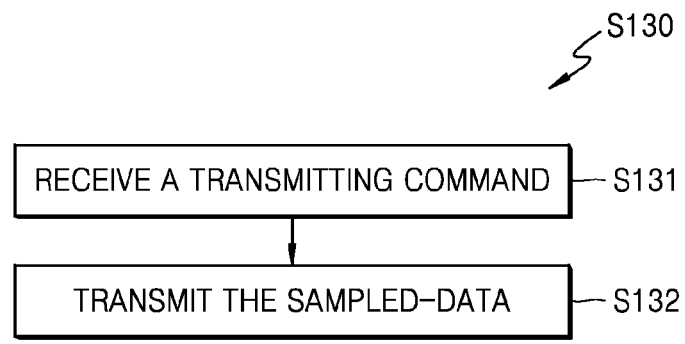
FIG. 12D is a flowchart of operation S130 of transmitting sampled data of FIG. 12A to a control side, according to an exemplary embodiment.

FIG. 12D is a flowchart of operation S130 of transmitting sampled data of FIG. 12A to a control side.

Referring to FIG. 12D, operation S130 may further include operation S131 of receiving a transmitting command and operation S132 of transmitting the sampled data.

Specifically, operation S131 of receiving the transmitting command may include receiving the transmitting command used for transmitting the sampled data.

Operation S132 of transmitting the sampled data may include transmitting the stored sampled data to the control side in response to the received transmitting command.

In the method of providing the sampled data, according to an exemplary embodiment of the inventive concept, the sampled data used for diagnosing the display system of the terminal may be acquired and stored by the terminal under the control of the controller.

Figure 12E:
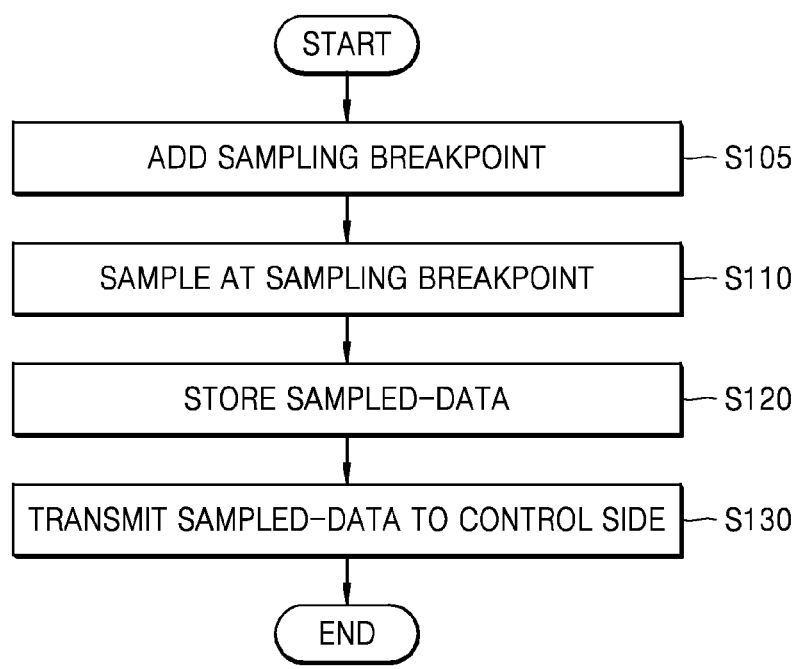
FIG. 12E is a flowchart of operation S130 of adding a sampling breakpoint to the method of 12A, according to an exemplary embodiment.

Furthermore, in order to acquire the sampled data more appropriately, a method described with reference to FIG. 12E may include operation S105 of adding the sampling breakpoint before operation S110 in addition to operations S110, S120, and S130.

Specifically, operation S105 of adding the sampling breakpoint may include adding the sampling breakpoint to a work layer of the display system. In an exemplary embodiment, the work layer may include an application framework layer, a hardware abstraction layer, and an operating system kernel layer. In an exemplary embodiment, at least one sampling breakpoint may be added to each work layer.

Accordingly, operation S110 (FIG. 12A) of starting sampling the display system at the sampling breakpoint may include starting sampling the display system at the added sampling breakpoint in response to the received sampling starting command to acquire sampled data.

Since the adding of the sampling breakpoint has been described with reference with FIG. 2A, descriptions thereof will be omitted herein.

Figure 12F:
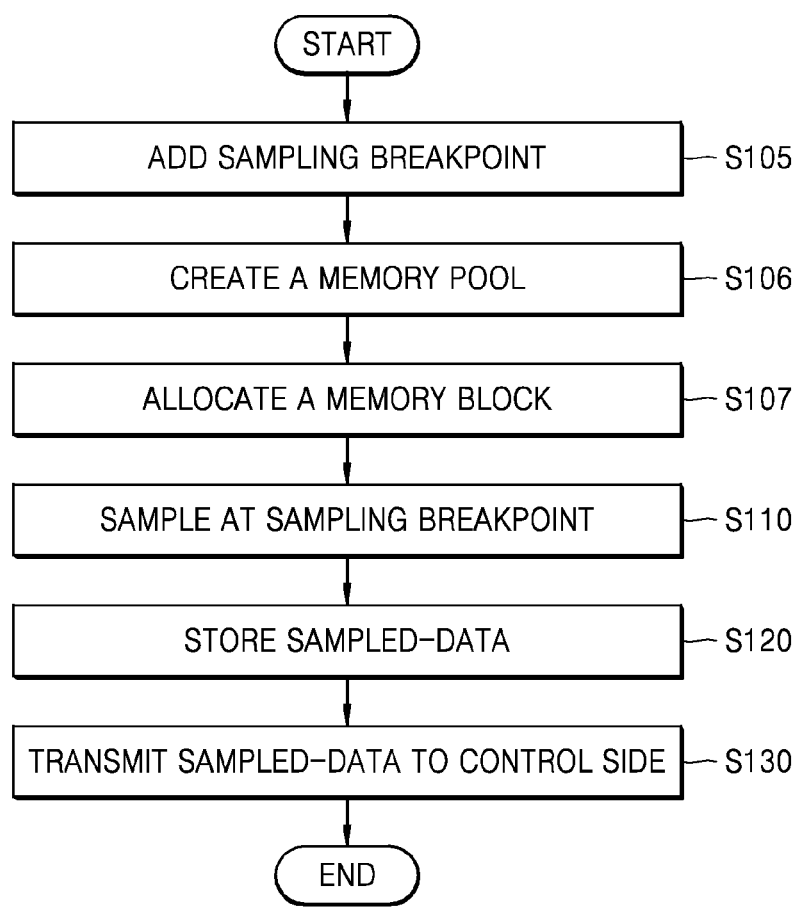
FIG. 12F is a flowchart of operation of creating a memory pool and operation allocating a memory block added to operation S130 of FIG. 12E, according to an exemplary embodiment.

In addition, in order to avoid affecting fluency of the display system, it is required to sample at the sampling breakpoint rapidly. However, the sampled data acquired though sampling is generally large in size (for example, in the case of a liquid crystal display having a resolution ratio of about 720p, the size of the sampled data is about 3 Megabyte). In order to store the sampled data that requires a large storage space more rapidly, a method described with reference to FIG. 12F may include operation S106 of creating a memory pool and operation S107 of allocating a memory block in addition to operations S110, S120, and S130, and operation S105 step of adding the sampling breakpoint.

Specifically, operation S106 of creating the memory pool may include creating the memory pool used for storing the sampled data. The memory pool may include a plurality of memory blocks.

Operation S107 of allocating the memory block may include allocating, to each added sampling breakpoint, the memory block used for storing the sampled data acquired through sampling at the sampling breakpoint.

In addition, operation S110 may further include storing the acquired sampled data in the memory block allocated to the sampling breakpoint according to a circular linked list mechanism when the sampled data is acquired through sampling at each added sampling breakpoint between operation S112 of starting sampling the display system at the sampling breakpoint and S115 operation of receiving the sampling stopping command.

Accordingly, after the sampling is stopped, in operation S120, the sampled data stored in each memory block may be stored in the storage.

Since the circular linked list storage mechanism has been described with reference to FIG. 3, descriptions thereof will be omitted herein.

Hereinafter, a method of displaying a diagnosis interface used for diagnosing a display system of a terminal at a control side, according to an exemplary embodiment of the inventive concept, will be described with reference to FIGS. 13 to 17. The method may be performed by the device described with reference to FIGS. 4 to 8 or by a computer program. For example, the method may be performed by an application installed in the terminal, which is used for displaying the diagnosis interface of the display system.

Figure 13:
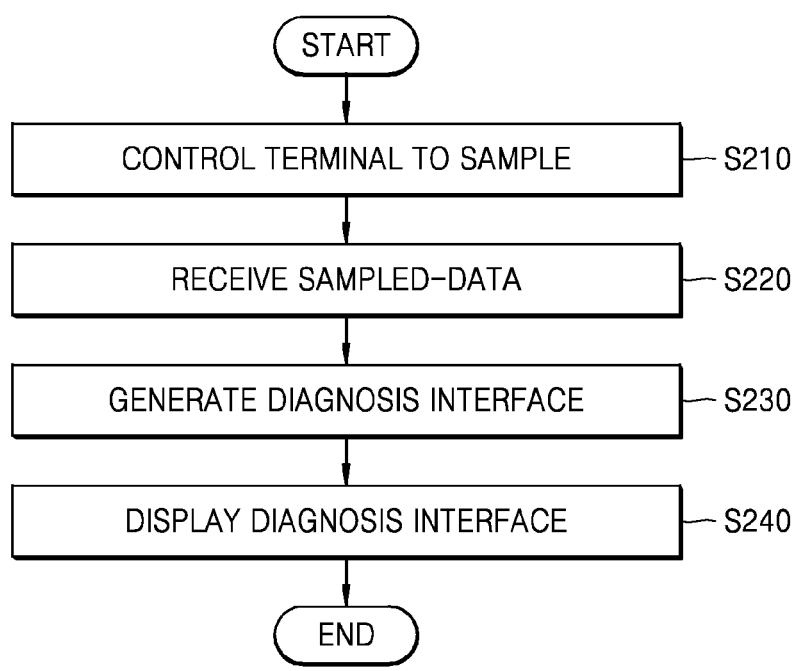
FIG. 13 is a flowchart of a method of displaying a diagnosis interface used for diagnosing a display system of a terminal at a control side, according to an exemplary embodiment.

FIG. 13 is a flowchart of the method of displaying the diagnosis interface used for diagnosing the display system of the terminal at the control side, according to an exemplary embodiment of the inventive concept.

Referring to FIG. 13, in operation S120, the terminal may be controlled to sample the display system of the terminal. The terminal may be controlled to start or stop sampling the display system of the terminal at the sampling breakpoint used for sampling.

Figure 14:
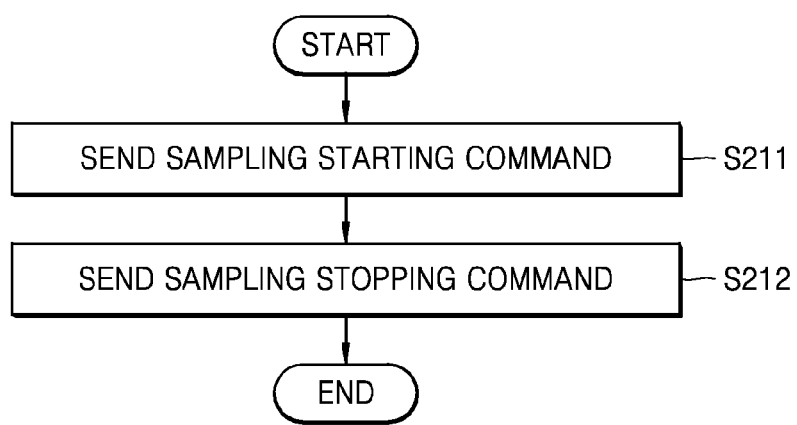
FIG. 14 is a flowchart of operation of controlling a terminal to sample a display system in a method of displaying a diagnosis interface used for diagnosing a display system of the terminal at a control side, according to an exemplary embodiment.

FIG. 14 is a flowchart of operation S210 of controlling the terminal to sample the display system in the method of displaying the diagnosis interface used for diagnosing the display system of the terminal at the control side, according to an exemplary embodiment of the inventive concept. Referring to FIG. 14, a sampling starting command may be sent in operation S211, and a sampling stopping command may be sent in operation S212.

Specifically, in operation S211, in order to control the terminal to start sampling the display system at the sampling breakpoint, the sampling starting command may be generated and sent to the terminal.

In an exemplary embodiment, in operation S211, a starting request for controlling the terminal to start sampling may be received, and the sampling starting command may be generated according to the starting request. In this case, it may be convenient for a user to manually control the terminal such that the terminal starts sampling the display system at the sampling breakpoint. For example, an associated button may be provided to the user for facilitating the user in inputting the starting request.

In operation S212, in order to control the terminal to stop sampling the display system at the sampling breakpoint, a sampling stopping command may be generated and sent to the terminal.

In an exemplary embodiment, in operation S212, a stopping request for controlling the terminal to stop sampling may be received, and the sampling stopping command may be generated according to the stopping request. In this case, it may be convenient for a user to manually control the terminal such that the terminal stops sampling the display system at the sampling breakpoint. For example, an associated button may be provided to the user for facilitating the user in inputting the stopping request.

Figure 15A:
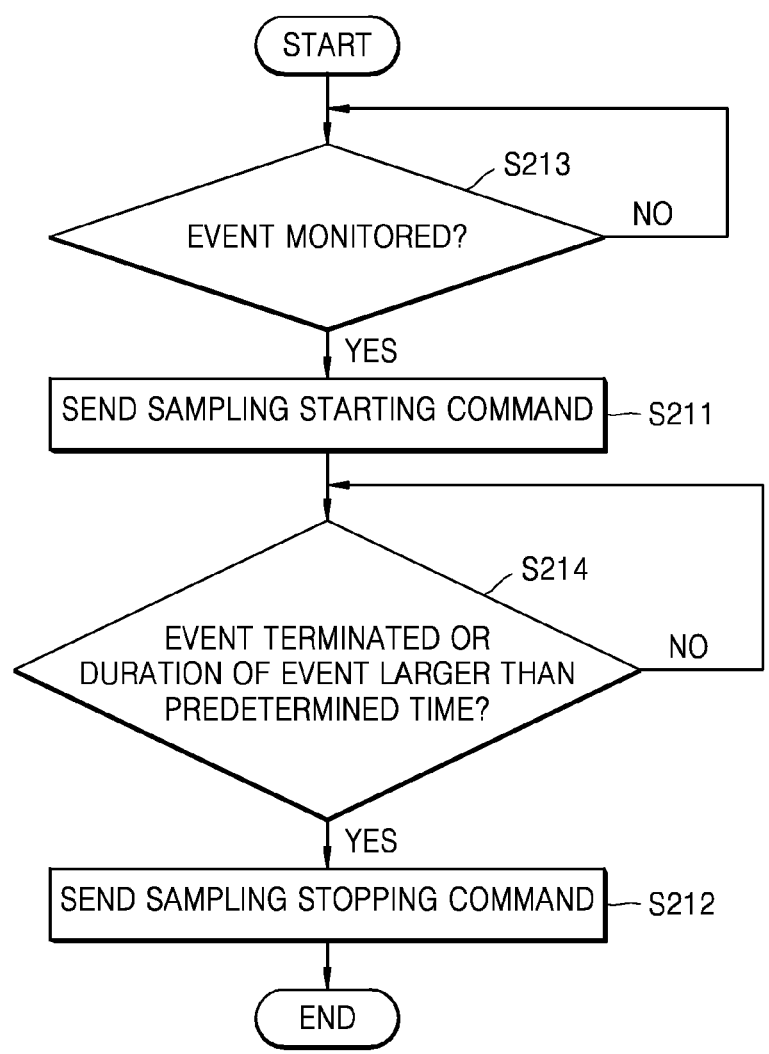
FIG. 15A is a flowchart of operation of controlling a terminal to sample a display system in a method of displaying a diagnosis interface used for diagnosing a display system of the terminal at a control side, according to another exemplary embodiment.

FIG. 15A is a flowchart of operation S210 of controlling the terminal to sample the display system in the method of displaying the diagnosis interface used for diagnosing the display system of the terminal at the control side, according to another exemplary embodiment of the inventive concept. Referring to FIG. 15, in addition to operation S211 of transmitting the sampling starting command and operation S212 of transmitting the sampling stopping command at step S212 described with reference to FIG. 14, operation S210 (FIG. 13) of controlling the terminal to sample may further include operation S213 of monitoring an event before operation S211, and operation S214 of monitoring whether the event has been terminated or whether the duration of the predetermined event is longer than a predetermined period of time before operation 212.

In particular, in operation S213, it may be monitored whether an event causing an abnormal display occurs in the terminal during the working process. In an exemplary embodiment, the event may include at least one selected from memory overflow of the terminal, CPU overuse in the terminal, interruption of a network accessed by the terminal, UI sliding of the terminal, and ANR of the terminal. These events may cause different kinds of abnormal display. For example, the memory overflow of the terminal and the CPU overuse of the terminal may cause screen not responding of the terminal, the interruption of a network accessed by the terminal may cause a picture to be stopped while the terminal plays a video, the UI sliding of the terminal may cause a blurred screen of the terminal, and the ANR of the terminal may cause a stopped screen picture of the terminal.

Accordingly, when the above events are monitored in operation S213, operation S211 may be performed. When it is monitored in operation S214 that an event has been terminated or the duration of the predetermined event is longer than the predetermined period of time, operation S212 may be performed. In this case, the terminal may be controlled automatically according to the event such that the terminal starts sampling the display system at the sampling breakpoint. For example, operation S211 may be performed when an event of the memory overflow is monitored, and operation S212 may be performed when the duration of the monitored event of the memory overflow is longer than the predetermined period of time.

Furthermore, when the event is even not monitored in operation S213, operation S213 may be performed again. When it is monitored in operation step S214 that the duration of the event is not longer than the predetermined period of time, operation S214 may be performed again.

Referring to FIG. 13 again, the sampled data acquired through sampling may be received from the terminal. In an exemplary embodiment, the sampled data may be the sampled data acquired through sampling of the display system at the sampling breakpoint used for sampling by the terminal at a predetermined frequency, and the sampled data may include frame information and status information related to at least one application displayed by the display system.

Figure 15B:
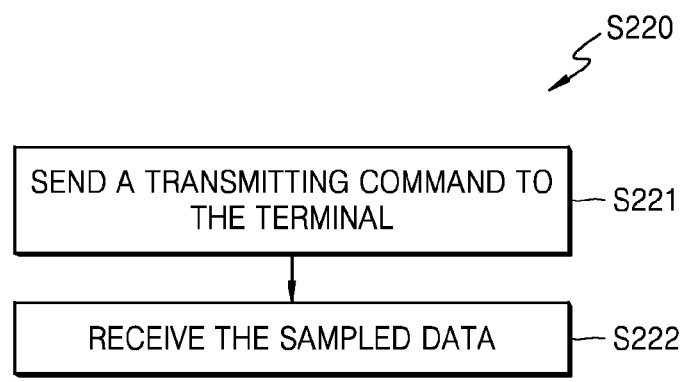
FIG. 15B is a flowchart of operation of receiving sampled data of FIG. 13, according to an exemplary embodiment.

FIG. 15B is a flowchart of operation S220 of receiving the sampled data of FIG. 13.

Referring to FIG. 15B, operation S220 of receiving the sampled data may include operation S221 of sending a transmitting command to the terminal and operation S222 of receiving the sampled data.

Specifically, operation S221 of sending the transmitting command to the terminal may include generating the transmitting command and sending the generated transmitting command to the terminal to control the terminal to transmit the sampled data. In an exemplary embodiment, a user-input transmitting request for transmitting the sampled data may be received, and the transmitting command may be generated according to the transmitting request. In another exemplary embodiment, when the sampling stopping command is sent in operation S212, the transmitting command may be generated.

Operation S222 of receiving the sampled data may include receiving the sampled data acquired through sampling, which is transmitted by the terminal according to the transmitting command.

Referring to FIG. 13 again, in operation S230, the diagnosis interface used for diagnosing the display system of the terminal may be generated based on the sampled data. In an exemplary embodiment, the diagnosis interface may include an image diagnosis window and a status diagnosis window. The image diagnosis window displays a frame image with respect to an application to be diagnosed, and the status diagnosis window displays a working status with respect to the application to be diagnosed. Alternatively, the diagnosis interface may include a frame image and a working status of an abnormal application, which are acquired through an analysis by an expert system, and the corresponding image diagnosis window and status diagnosis window may be arranged in a visual manner.

Figure 16:
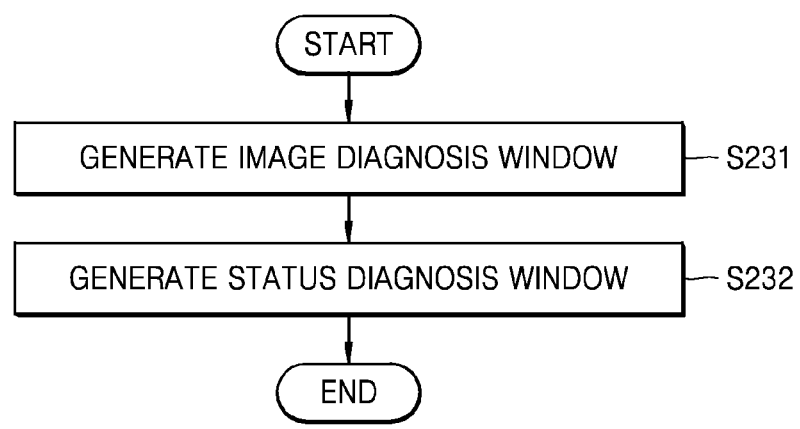
FIG. 16 is a flowchart of operation of generating a diagnosis interface in a method of displaying the diagnosis interface used for diagnosing a display system of a terminal at a control side, according to an exemplary embodiment.

FIG. 16 is a flowchart of operation S230 of generating the diagnosis interface in the method of displaying the diagnosis interface used for diagnosing the display system of the terminal at the control side, according to an exemplary embodiment of the inventive concept. Referring to FIG. 16, an image diagnosis window may be generated in operation S231, and a status diagnosis window may be generated in operation S232.

Specifically, in operation step S231, the image diagnosis window may be generated based on the frame information of the application that is being under diagnosis.

In operation S232, the status diagnosis window may be generated based on the status information of the application that is being under diagnosis.

Figure 17:
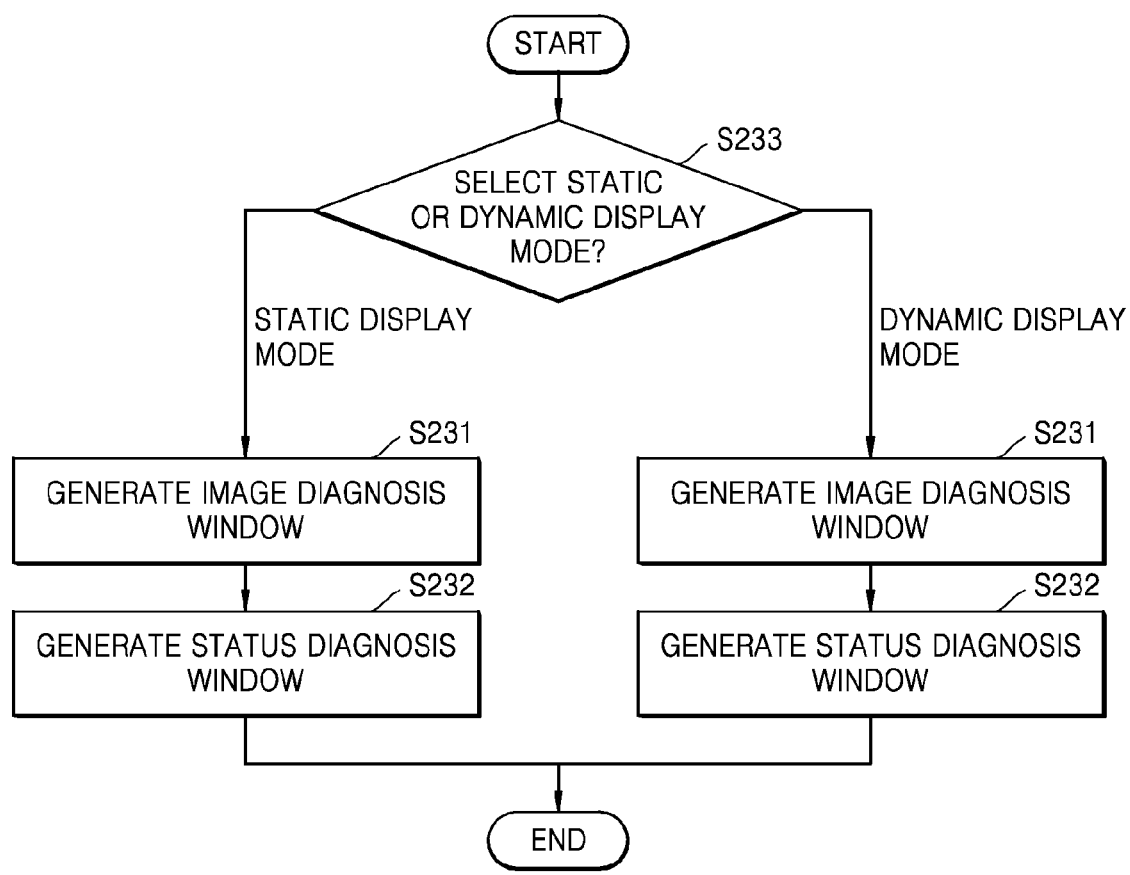
FIG. 17 is a flowchart of operation of generating a diagnosis interface in a method of displaying the diagnosis interface used for diagnosing a display system of a terminal at a control side, according to another exemplary embodiment.

FIG. 17 is a flowchart of operation S230 of generating the diagnosis interface in a method of displaying the diagnosis interface used for diagnosing the display system of the terminal at the control side, according to another exemplary embodiment of the inventive concept. Referring to FIG. 17, operation S230 of generating the diagnosis interface may further include operation 233 of selecting a static display mode or a dynamic display mode before operations S231 and S232 in addition to operation S231 for generating the image diagnosis window and operation S232 of generating the status diagnosis window at operation S232 described with reference to FIG. 16.

In an exemplary embodiment, a request for selecting a display mode by the user may be received and a display mode may be selected according to the user's request.

Specifically, in the static display mode, the application that is being under diagnosis may include at least one application displayed by the display system. The image diagnosis window and the status diagnosis window may display a frame image and a working status related to the at least one application at a predetermined time, respectively.

In the dynamic display mode, the application that is being under diagnosis may include a predetermined application of the at least one application displayed the display system. The image diagnosis window and the status diagnosis window may display a frame image and a working status related to the at least one application during the predetermined period of time, respectively.

Therefore, the image diagnosis window may be generated according to the selected static display mode or dynamic display mode. In an exemplary embodiment, when the selected display mode is the static display mode, the image diagnosis window may be generated based on the frame information of the at least one application acquired at the predetermined time. In another exemplary embodiment, when the selected display mode is the dynamic display mode, the image diagnosis window may be generated based on the frame information of the at least one application acquired during the predetermined period of time.

Moreover, in operation S232, the status diagnosis window may be generated according to the selected static display mode or dynamic display mode. In an exemplary embodiment, when the selected display mode is the static display mode, the status diagnosis window may be generated based on the status information of the at least one application acquired at the predetermined time. In another exemplary embodiment, when the selected display mode is the dynamic display mode, the status diagnosis window may be generated based on the status information of the at least one application acquired during the predetermined period of time.

In addition, in order to facilitate the selection of the predetermined time, when the selected display mode is the static display mode, in operation S233, the predetermined time for the static display mode may be further be selected. On the contrary, in order to facilitate the selection of the predetermined period of time, when the selected display mode is the dynamic display mode, in operation S233, the predetermined period of time for the dynamic display mode may be further be selected.

In an exemplary embodiment, the predetermined time or the predetermined period of time may be selected according to the user's input.

In addition, in operation S233, the predetermined application for the dynamic display mode may be further selected from the at least one application displayed by the display system of the terminal. One of the at least one application displayed by the display system of the terminal may be selected as the predetermined application for dynamic displaying.

Referring to FIG. 13 again, in operation S240, the generated diagnosis interface may be displayed. In an exemplary embodiment, the image diagnosis window generated in operation S231 and the status diagnosis window generated in operation S232 may be displayed to the user In the method of displaying the diagnosis interface, according to an exemplary embodiment of the inventive concept, an intuitional diagnosis interface may be generated based on the sampled data at the control side, and the efficiency of the display system of the user diagnosis terminal may be improved effectively.

Since the diagnosis interface has been described with reference with FIGS. 9 to 11, descriptions thereof will be omitted herein.

In conclusion, sampled data of a display system of a terminal may be acquired at the terminal according to the above exemplary embodiments of the inventive concept. A diagnosis interface may be generated using the sampled data acquired by the terminal at the terminal according to the above exemplary embodiments of the inventive concept. Therefore, the user may diagnose the display system of the terminal conveniently, and the efficiency of the display system of the user diagnosis terminal may be improved effectively.

At least one of the components, elements, modules or units represented by a block as illustrated in FIGS. 1A-1D, 2B, 2C, 4, 6A, 6B, 7 and 8 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

It is to be noticed that the various embodiment of the inventive concept described above are merely exemplary and the inventive concept is not limited thereto. For example, the structures described with reference to FIGS. 5 to 8 are by way of illustration only and should not be construed in any way to limit the controller and the diagnosis interface generator. It should be understood by those skilled in the art that changes may be made in these exemplary embodiments of the inventive concepts without departing from the principles and spirit of the inventive concept, the scope of which is defined in the claims and their equivalents.

What is claimed is:

1. A device for diagnosing a display system of a terminal, the device comprising:
   at least one processor configured to implement a sampling module which samples the display system of the terminal at at least one sampling breakpoint to acquire sampled data used for diagnosing the display system of the terminal;
   a storage configured to store the sampled data acquired by the sampling module; and
   a transmitter configured to transmit the sampled data stored in the storage for the diagnosing the display system,
   wherein the processor is configured to implement a breakpoint adding module which adds the at least one sampling breakpoint to at least one work layer of the display system, and
   wherein the work layer comprises an application framework layer, a hardware abstraction layer, and an operating system kernel layer, and the at least one sampling breakpoint is added to each of the at least one work layer by the breakpoint adding module.

2. The device of claim 1, wherein the processor is configured to implement a breakpoint adding module which adds the at least one sampling breakpoint to at least one work layer of the display system,
   wherein the work layer comprises an application framework layer, a hardware abstraction layer, and an operating system kernel layer, and the at least one sampling breakpoint is added to each of the at least one work layer by the breakpoint adding module.

3. The device of claim 2, wherein the processor is configured to implement:
   a memory creator which creates a memory pool which is used for storing the sampled data and comprises a plurality of memory blocks; and
   a memory block allocator which allocates a memory block, among the plurality of memory blocks, used for storing the sampled data acquired through the sampling at the at least one sampling breakpoint to each of the at least one sampling breakpoint.

4. The device of claim 1, wherein the sampled data comprises at least one of frame information and status information related to at least one application displayed by the display system, and
   wherein the frame information comprises information about an image of the at least one application, and the status information comprises information about a working status of the at least one application.

5. The device of claim 1, wherein the sampling breakpoint comprises a location of the sampling set in at least one work layer of the display system, and
   wherein the work layer comprises an application framework layer, a hardware abstraction layer, and an operating system kernel layer.

6. The device of claim 1, wherein the processor is configured to implement a diagnosis interface generator which generates a diagnosis interface used for diagnosing the display system of the terminal based on the sampled data, and
   wherein the device further comprises a display configured to display the diagnosis interface generated by the diagnosis interface generator.

7. The device of claim 6, wherein the diagnosis interface comprises:
   an image diagnosis window configured to display a frame image with respect to an application which is being under diagnosis; and
   a status diagnosis window configured to display a working status with respect to the application which is being under diagnosis.

8. The device of claim 7, wherein the diagnosis interface generator further comprises:
   an image generator configured to generate the image diagnosis window based on frame information of the application;
   a status generator configured to generate the status diagnosis window based on status information of the application; and
   a display mode selector configured to select a static display mode or a dynamic display mode.

9. A device for diagnosing a display system of a terminal, the device comprising:
   at least one processor configured to implement:
      a controller which controls the terminal to sample the display system of the terminal;
      a receiving module which receives sampled data acquired through the sampling from the terminal; and
      a diagnosis interface generator which generates a diagnosis interface used for diagnosing the display system of the terminal based on the sampled data; and
   a display configured to display the diagnosis interface generated by the diagnosis interface generator,
   wherein the controller comprises:
      a sampling starting command sender configured to generate a sampling starting command and send the generated sampling starting, command to the terminal to control the terminal to start the sampling at a sampling breakpoint; and
      a sampling stopping command sender configured to generate a sampling stopping command and send the generated sampling stopping command to the terminal to control the terminal to stop the sampling at the sampling breakpoint.

10. The device of claim 9, wherein the controller further comprises a monitor configured to monitor whether an event causing an abnormal display occurs in the terminal during a working process, and
    wherein the sampling starting command is generated by the sampling starting command sender in response to monitoring the event by the monitor, and the sampling stopping command is generated by the sampling stopping command sender in response to the event being terminated or a duration of the event being longer than a predetermined period of time.

11. The device of claim 9, wherein the diagnosis interface comprises:
    an image diagnosis window configured to display a frame image with respect to an application which is being under diagnosis; and
    a status diagnosis window configured to display a working status with respect to the application which is being under diagnosis.

12. The device of claim 11, wherein the diagnosis interface generator further comprises:
    an image generator configured to generate the image diagnosis window based on frame information of the application;

a status generator configured to generate the status diagnosis window based on status information of the application; and a display mode selector configured to select a static display mode or a dynamic display mode.

13. The device of claim 12, wherein the image diagnosis window is generated by the image generator according to the static display mode or the dynamic display mode selected by the display mode selector.

14. The device of claim 12, wherein the status diagnosis window is generated by the status generator according to the static display mode or the dynamic display mode selected by the display mode selector.

15. A method of providing sampled data used for diagnosing a display system of a terminal, the method comprising:

acquiring sampled data by sampling the display system of the terminal at at least one sampling breakpoint;

storing the sampled data; and transmitting the stored sampled data for the diagnosing the display system, wherein the method further comprising:

generating a sampling starting command for staring the sampling of the display system at the sampling break point, and sending the generated sampling starting command to the terminal to start the sampling at a sampling breakpoint; and generating a sampling stopping command for stopping the sampling of the display system, and sending the generated sampling stopping command to the terminal to stop the sampling at a sampling breakpoint.

16. The method of claim 15, further comprising:

adding the at least one sampling breakpoint to at least one work layer of the display system;

creating a memory pool including a plurality of memory blocks to store the sampled data; and allocating a memory block, among the plurality of memory blocks, to each of the at least one sampling breakpoint, the memory block storing the sampled data acquired through the sampling at the at least one sampling breakpoint.

17. The method of claim 15, further comprising generating a diagnosis interface based on the sampled data, the diagnosis interface diagnosing the display system of the terminal.

18. The method of claim 15, further comprising monitoring whether an event causing an abnormal display occurs at the terminal in a working process, wherein the sampling starting command is generated by the sampling starting command sender in response to monitoring the event by the monitor, and the sampling stopping command is generated by the sampling stopping command sender in response to the event being terminated or a duration of the event being longer than a predetermined period of time.

\* \* \* \* \*